United States Patent
Nagashima

[11] Patent Number: 6,056,668
[45] Date of Patent: May 2, 2000

[54] POWER MACHINE HAVING SAFETY MECHANISM

[75] Inventor: Akira Nagashima, Kawasaki, Japan

[73] Assignee: Kioritz Corporation, Tokyo, Japan

[21] Appl. No.: 09/157,578

[22] Filed: Sep. 21, 1998

[30] Foreign Application Priority Data

Sep. 22, 1997 [JP] Japan ................................. 9-275290
Nov. 21, 1997 [JP] Japan ................................. 9-338118

[51] Int. Cl.⁷ .................................................. B60K 41/20
[52] U.S. Cl. ........................... 477/207; 30/276; 30/298; 74/483 R; 74/551.3; 74/489; 403/97; 403/385; 477/199; 477/200
[58] Field of Search .......................... 30/276, 298, 390; 74/551.3, 483 R, 489; 403/97, 385; 477/199, 200, 207

[56] References Cited

U.S. PATENT DOCUMENTS

| 2,229,056 | 1/1941 | Dick | 477/207 |
| 3,912,056 | 10/1975 | Neal | 477/207 X |
| 4,006,528 | 2/1977 | Katsuya | 30/276 |
| 4,288,171 | 9/1981 | Kottke | 403/218 |
| 4,761,939 | 8/1988 | Zerrer | 56/12.7 |
| 4,900,183 | 2/1990 | Souchko | 403/385 |
| 5,427,465 | 6/1995 | Sato | 403/385 X |

FOREIGN PATENT DOCUMENTS 10-35319  2/1998  Japan ............................ B60K 26/04

Primary Examiner—Allan D. Herrmann
Attorney, Agent, or Firm—Michael D. Bednarek; Crowell & Moring LLP

[57] ABSTRACT

A power machine comprises an output manipulation system for controlling an output of a power source given to a working member and a brake manipulation system for stopping the movement of the working member. A pair of output manipulation restriction portions is disposed between the output manipulation system and the brake manipulation system. The output manipulation restriction portions abut to each other so as to restrict output manipulation to the working member by an output manipulation member when the working member is in the braked state. Furthermore, a pair of brake manipulation restriction portions is disposed between the output manipulation system and the brake manipulation system. The pair of brake manipulation restriction portions abut to each other so as to restrict brake manipulation of the working member by a brake manipulation member during the power source gives the output to the working member. Thus, a damage of the machine or an energy loss due to a mismanipulation of the output manipulation member and the brake manipulation member is avoided.

14 Claims, 25 Drawing Sheets (In a braked state)

(In an output state)

(In a braked state)

(In an output state)

(In a braked state)

(In an output state)

(In a braked state)

(In an output state)

POWER MACHINE HAVING SAFETY MECHANISM

BACKGROUND OF THE INVENTION

The present invention relates to a power machine, and more particularly to a power machine having an output manipulation system for controlling an output given to a working member and a brake manipulation system for stopping the movement of the working member.

For example, in the grass cutting machine, which is a kind of power machine, when an operator manipulates an output manipulation member to stop the output to the working member, i.e., a cutter blade, the blade will continue to rotate by its inertia. Therefore, a grass cutting machine having a brake manipulation member is proposed, which is used for stopping the working member quickly so as to improve a safety of the working operation.

In the above-mentioned grass cutting machine, if the operator mistakes a sequential manipulation of the output manipulation member and the brake manipulation member, the machine can be damaged. For example, if the brake manipulation member is manipulated to stop the working member rapidly with maintaining the output of the power source given to the working member, the drive system or the brake system may be damaged by an overstress, or an energy loss may be occur. It will be the same situation if the output manipulation member is mismanipulated to increase the output with holding the working member in a braked state.

SUMMARY OF THE INVENTION

The present invention is directed to providing a power machine that can prevent a damage of devices and an energy loss due to a mismanipulation of the output manipulation member and the brake manipulation member.

In order to perform the object, a power machine according to the present invention comprises an output manipulation system for controlling an output of a power source given to a working member, and a brake manipulation system for stopping the movement of the working member. A pair of output manipulation restriction portions is disposed between the output manipulation system and the brake manipulation system. The output manipulation restriction portions abut to each other so as to restrict output manipulation to the working member by an output manipulation member when the working member is in the braked state. In addition, a pair of brake manipulation restriction portions is disposed between the output manipulation system and the brake manipulation system. The brake manipulation restriction portions abut to each other so as to restrict brake manipulation of the working member by a brake manipulation member during the power source gives the output to the working member.

According to the present invention, when the working member is in the braked state, if trying to output a power to the working member, the output manipulation restriction portions disposed as a pair between the output manipulation system and the brake manipulation system abut to each other. Therefore, the output manipulation member cannot be manipulated before releasing the brake of the working member by manipulating the brake manipulation member. On the other hand, during the power source gives the output to the working member, if trying to stop the working member, the brake manipulation restriction portions disposed as a pair between the output manipulation system and the brake manipulation system abut to each other. Therefore, the brake manipulation member cannot be manipulated before stopping the output to the working member by manipulating the output manipulation member. Thus, the power machine according to the present invention does not have the problems such as a damage of the machine or an energy loss since the mismanipulation of the output manipulation member and the brake manipulation member cannot occur.

Preferably, the power machine according to the present invention further comprises an output manipulation gang member that moves along with the output manipulation member and is connected to an output control member of the power source, and a brake manipulation gang member that moves along with the brake manipulation member and is connected to a brake member. Each of the output manipulation gang member and the brake manipulation gang member is provided with a set of the output manipulation restriction portion and the brake manipulation restriction portion.

In this case, when the output manipulation member is manipulated, the output manipulation gang member moves along with the output manipulation member, and the output control member is moved along with the output manipulation gang member. On the other hand, when the brake manipulation member is manipulated, the brake manipulation gang member is moved along with the brake manipulation member, and the brake member is moved along with the brake manipulation gang member. Then, the output manipulation restriction portion and the brake manipulation restriction portion disposed as a set to each of the output manipulation gang member and the brake manipulation gang member abut to each other, and restrict the movement of the opposing gang member alternately. Thus, mismanipulation of the output manipulation member and the brake manipulation member is prevented.

The power machine according to the present invention also comprises preferably an output manipulation gang member that moves along with the output manipulation member and is connected to an output control member of the power source, and the brake manipulation member is connected to a brake member and a brake manipulation gang member via different paths. Each of the output manipulation gang member and the brake manipulation gang member is provided with a set of the output manipulation restriction portion and the brake manipulation restriction portion.

In this case, when the brake manipulation member is manipulated, the brake manipulation gang member and the brake member work simultaneously by the different paths.

In another aspect of the present invention, the power machine comprises an output manipulation member for controlling an output of a power source given to a working member, an output manipulation gang member that moves along with the output manipulation member, a brake manipulation member for manipulating a brake device of the working member, a brake manipulation gang member that moves along with the brake manipulation member, and a pair of output manipulation restriction portions disposed between the output manipulation gang member and the brake manipulation gang member. The output manipulation restriction portions abut to each other so as to restrict output manipulation to the working member by an output manipulation member when the working member is in the braked state. The power machine also comprises a pair of brake manipulation restriction portions disposed between the output manipulation gang member and the brake manipulation gang member. The brake manipulation restriction portions abut to each other so as to restrict brake manipulation of the working member by a brake manipulation member when the power source gives output to the working member.

In this case, when the operator manipulates the output manipulating member in the output increasing direction, the output manipulation gang member moves, and the power source begins to give output to the working member. In this state, if the brake manipulation member is manipulated in the braking direction, the brake manipulation restriction portions disposed between the output manipulation gang member and the brake manipulation gang member abut to each other, and the brake manipulation member cannot be manipulated. If the operator want to manipulate the brake manipulation member in the braking direction, the operator should manipulate the output manipulation member in the output stopping direction before that. Thus, the damage of the machine is prevented, and a waste of power output is avoided.

On the other hand, if the operator manipulates the brake manipulation in the braking direction, the brake manipulation gang member moves, and the working member is braked by the brake device. In this condition, even if the output manipulation member is mismanipulated in the output increasing direction, the output manipulation restriction portions disposed between the output manipulation gang member and the brake manipulation gang member abut to each other, and the output manipulation member cannot be manipulated. If the operator want to manipulate the output manipulation member in the output increasing direction, the operator should manipulate the brake manipulation member in the brake releasing direction before that. Thus, the damage of the machine is prevented, and a waste of power output is avoided.

It is preferable that the power source is an internal combustion engine, and an engine start assist gap is provided between the pair of output manipulation restriction portions. The gap permits the movement of the output manipulation member within a predetermined range so that a throttle valve of a carburetor can open to the extent that the engine can start smoothly but the working member can not move when the working member is in the braked state.

In this case, when the engine is started, the working member is set in the braked state for safety by manipulating the brake manipulation member. Then, the output manipulation member is manipulated to open the throttle valve within the range corresponding to the engine start assist gap, if necessary. Thus, the engine can start easily.

It is also preferable that the output manipulation gang member and the brake manipulation gang member are arranged in the longitudinal direction of the manipulation rod supporting the working member, and are disposed adjacent to the manipulation rod. Thus, a protrusion in the direction crossing the longitudinal direction of the manipulation rod due to the output manipulation gang member and the brake manipulation gang member is suppressed to as small as possible. Accordingly, the whole contour of the machine can be slim and a good manipulation performance can be obtained.

It is also preferable that the output manipulation gang member and the brake manipulation gang member are pivoted. In this case, each of the output manipulation gang member and the brake manipulation gang member moves in an arc. This movement is smooth and ensures a sufficient distance for the movement of the pair of brake manipulation restriction portions and the pair of output manipulation restriction portions in a small space compared with the reciprocating movement, so that a compact size can be realized.

It is also preferable that the brake manipulation restriction portion includes a sector shaped portion whose center is a swing center of the output manipulation gang member. Thus, the braking manipulation of the working member by the brake manipulation member can be restricted securely over the whole range of the output power given to the working member by the power source when the working member is driven.

The power machine according to the present invention also comprises preferably a housing in which the output manipulation gang member and the brake manipulation gang member are disposed. By this structure, since the output manipulation gang member and the brake manipulation gang member are covered by the housing, their movement are not disturbed from outside, nor affect the working operation.

The power machine according to the present invention also comprises preferably transmission members connected to the output manipulation gang member and the brake manipulation gang member, and the connection positions of the transmission members with the output manipulation gang member and the brake manipulation gang member are shifted from each other, so that the transmission members do not contact with each other in the housing. By this structure, the transmission members do not contact with each other in the housing. Therefore, performance of power transmission to the output manipulation gang member and the brake manipulation gang member is improved, and the abrasion of the transmission members can be avoided.

It is also preferable that the housing includes a first casing half supporting the brake manipulation gang member and a second casing half supporting the output manipulation gang member, which are combined with each other. This structure of the housing can be assembled, for example, by supporting the brake manipulation gang member by the first casing half, supporting the output manipulation gang member by the second casing half, and combining the first and the second casing halves with each other. Thus, the assembling is performed easily.

It is also preferable that at least one of the casing halves is molded as one unit with another part of the machine. By this structure, manufacturing and assembling of the machine can be performed easily.

It is also preferable that the housing includes a plurality of casing halves combined with each other, and at least one of the casing halves is molded as one unit with another part of the machine. By this structure too, manufacturing and assembling of the machine can be performed easily.

The power machine according to the present invention preferably comprises a manipulation rod that supports the working member and a manipulation handle that is connected with the manipulation rod and has the output manipulation member as well as the brake manipulation member. Furthermore, an output manipulation gang member and a brake manipulation gang member are disposed between the manipulation rod and the manipulation handle.

By this structure, the transmission members extending from the output manipulation gang member and the brake manipulation gang member can be arranged to extend along and closely to the manipulation handle and the manipulation rod. Therefore, the whole contour of the machine can be compact, and the manipulation performance can be improved since the transmission members cannot disturb the operation.

The power machine according to the present invention preferably comprises a manipulation rod that supports the working member and a manipulation handle that is connected with the manipulation rod and has the output manipulation member as well as the brake manipulation member. Furthermore, the housing is disposed between the manipulation rod and the manipulation handle. By this structure too, the same effect as the above-mentioned structure can be obtained.

The power machine according to the present invention preferably comprises a manipulation handle attachment member for fixing the manipulation handle to the manipulation rod. The manipulation handle attachment member includes a manipulation rod side attachment member and a manipulation handle side attachment member, which are combined with each other in different angles between them. By this structure, when storing or transporting the machine, for example, the angle between the manipulation handle and the manipulation rod can be changed properly to make the contour of the machine more compact. Thus, the handling performance of the machine for storing or transporting can be improved.

It is preferable that a plurality of engaging portions is formed between the manipulation rod side attachment member and the manipulation handle side attachment member. The engaging portions are engaged with each other so that a variable angle can be formed between the manipulation rod side attachment member and the manipulation handle side attachment member. The manipulation rod side attachment member and the manipulation handle side attachment member are fixed removably with each other by a fastening means. In this structure, the angle between the manipulation handle and the manipulation rod can be changed easily. The angle is changed only by loosing the fastening means to change the relative engaging position between the engaging portions, and fastening the fastening means again.

DETAILED DESCRIPTION OF THE PREFERRED EMBODIMENTS

FIRST EXAMPLE

A first example of the present invention will be explained with reference to FIGS. 1 to 6.

Figure 1:
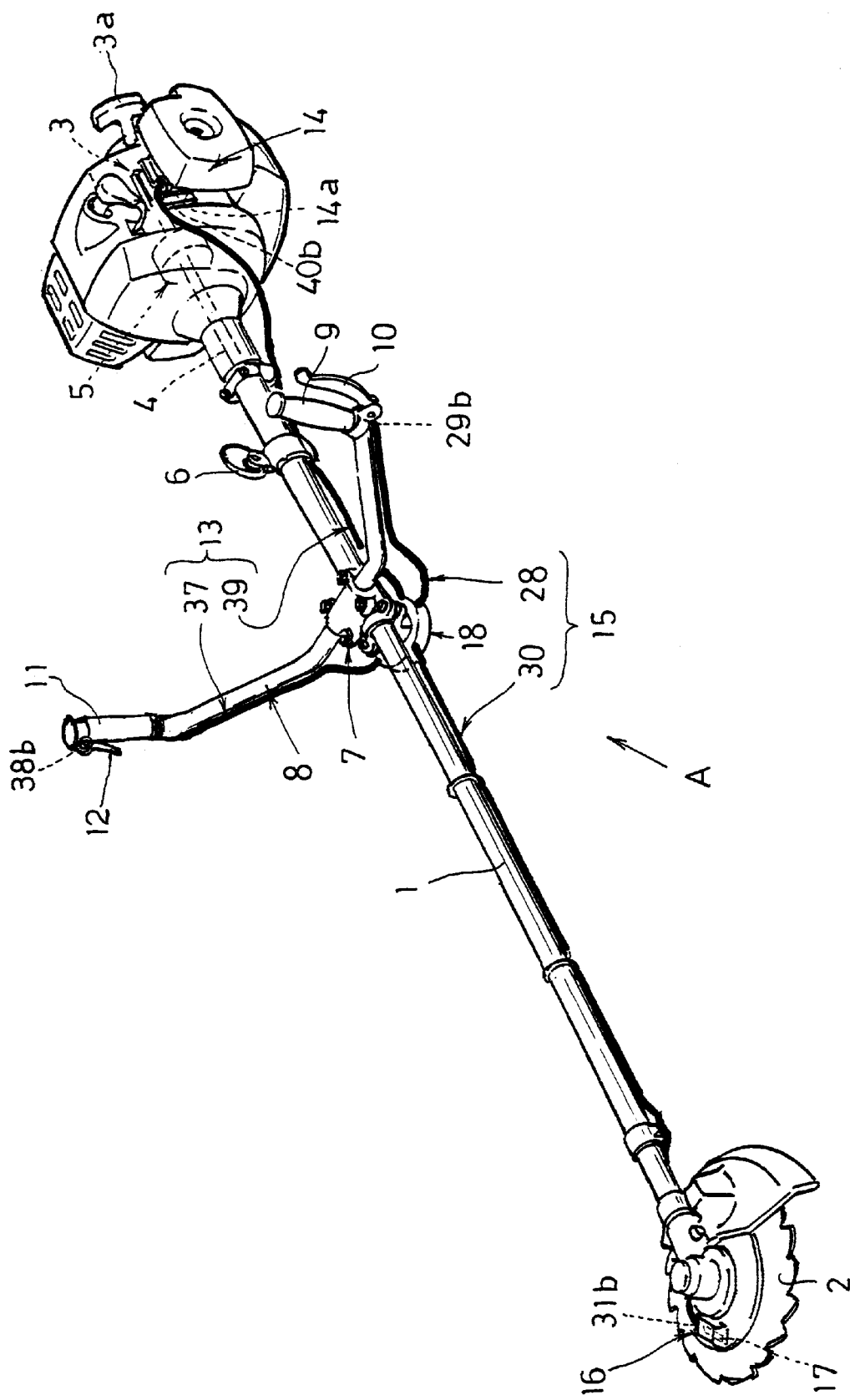
FIG. 1 is a general perspective view of a grass cutting machine as a first example of a power machine according to the present invention.

As shown in FIG. 1, a grass cutting machine as an example of a power machine according to the present invention comprises a rotation cutter blade 2 as a working member provided to the distal end of a manipulation rod 1 extending from the front to the rear, and a power source such as a compact air-cooled two cycle internal combustion engine 3 provided to the proximal end of the manipulation rod 1. A driving force of the engine 3 is transmitted to the cutter blade 2 via a transmission shaft 4 disposed in the manipulation rod 1. A proper type of centrifugal clutch 5 is disposed between the engine 3 and the transmission shaft 4, so that the rotational drive force by the engine 3 is transmitted to the cutter blade 2 when the rotation speed of the engine 3 exceeds a predetermined value to connect the centrifugal clutch 5.

The manipulation rod 1 has a hanger hook 6 at a portion adjacent to the engine 3. The hanger hook 6 is used for hooking a shoulder belt (not shown) so that the operator can carry the machine by the belt.

In addition, a substantially U-shaped manipulation handle 8 is fixed to the manipulation rod 1 with a proper type of manipulation handle attachment member 7. The manipulation handle 8 is provided with a brake lever 10 as a brake manipulation member that is attached to the left grip portion 9 of the manipulation handle 8. The right grip portion 11 of the manipulation handle 8 is provided with a throttle lever 12 as an output manipulation member.

The throttle lever 12 is connected to a throttle valve 14a of a carburetor 14, which is the output control member of the engine 3, via a throttle manipulating Bowden cable 13. In this example, a spring (not shown) normally applies a force to the throttle valve 14a in the direction to the idling rotation opening degree. The throttle valve 14a is connected to inner wires 38 and 40 (shown in FIG. 3) of the throttle manipulating Bowden cable 13. When the operator manipulate the throttle lever 12 in the direction approaching the right grip portion 11 of the manipulation handle 8 by his/her finger gripping the right grip portion 11, the inner wires 38 and 40 are pulled to the front out of the non-operational state, so that the throttle valve 14a begins to open in the direction of increasing the rotation speed (output) of the engine 3 from the idling rotation. On the other hand, if the operator release the throttle lever 12, the inner wires 38 and 40 of the throttle manipulating Bowden cable 13 are pulled to the rear by the restoring action of the spring, so that the throttle lever 12 returns automatically to the original non-operational state, and the throttle valve 14a returns automatically to the idling rotation opening degree.

The brake lever 10 is connected to a brake device 16 via a brake manipulating Bowden cable 15. Any type can be used for the brake device 16. In this example shown in FIG. 1, a wedge type brake is used for the brake device 16, which has a brake shoe 17 as a brake action member pressed onto the surface of the cutter blade 2. Inner wires 29 and 31 of the brake manipulating Bowden cable 15 (shown in FIG. 3) is normally pulled in the direction to the cutter blade 2 with the force given to the brake shoe 17 by a spring (not shown) for braking toward a braking position. When the brake lever 10 is released, the brake shoe 17 contacts the upper surface of the cutter blade 2, which is in the braked state. When the operator grips the brake lever 10 so as to approach the left grip portion 9 of the manipulation handle 8, the inner wire 29 and 31 of the brake manipulating Bowden cable 15 are pulled and the brake shoe 17 moves back to the release position away from the upper surface of the cutter 2.

A throttle manipulation system as an output manipulation system from the throttle lever 12 to the throttle valve 14a, and a brake manipulation system from the brake lever 10 to the brake device 16 are linked to each other by the following control link mechanism 18.

Figure 2:
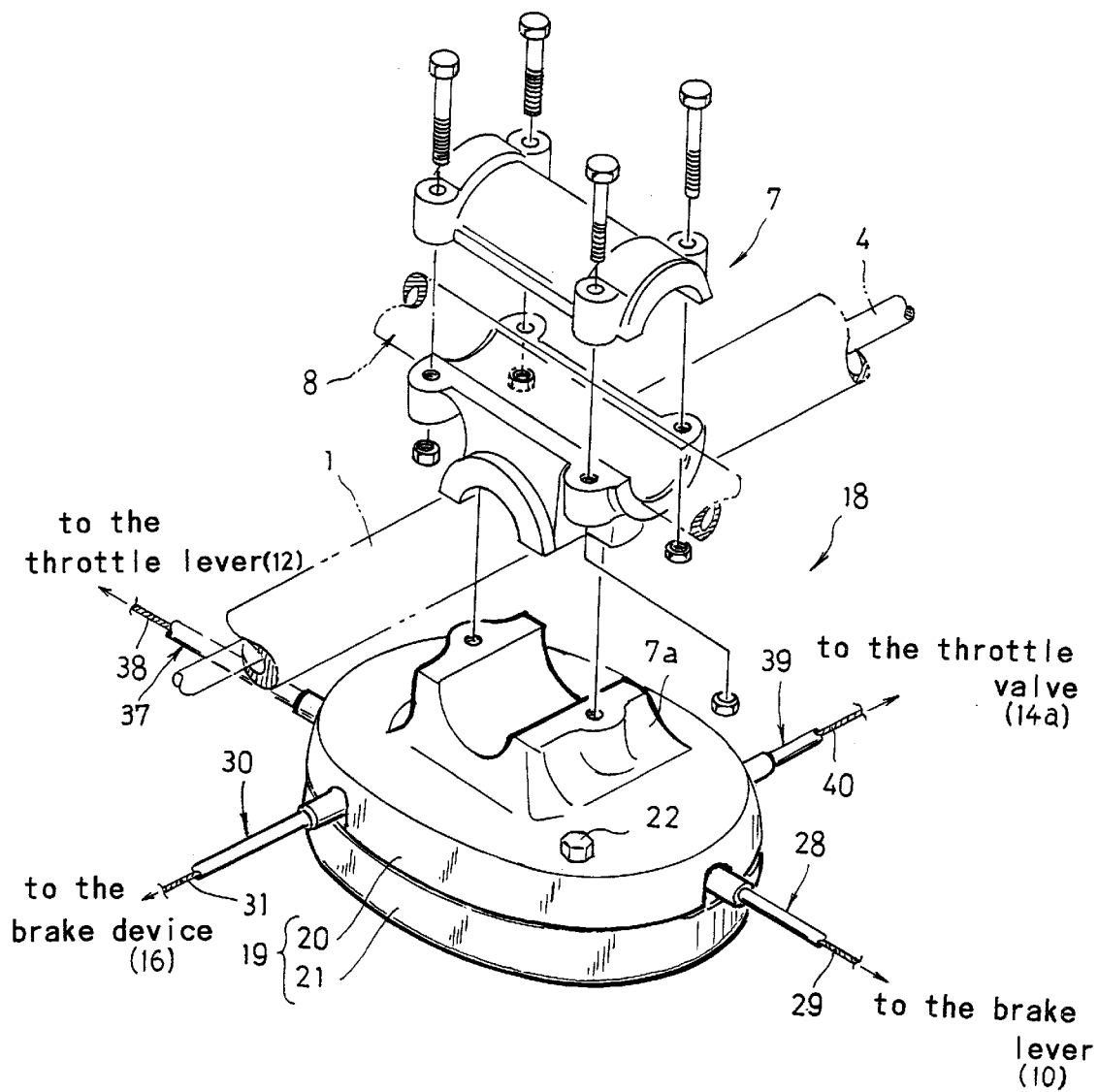
FIG. 2 is an exploded view of a manipulation handle attachment member viewed in the direction of the arrow A in FIG. 1.
Figure 3:
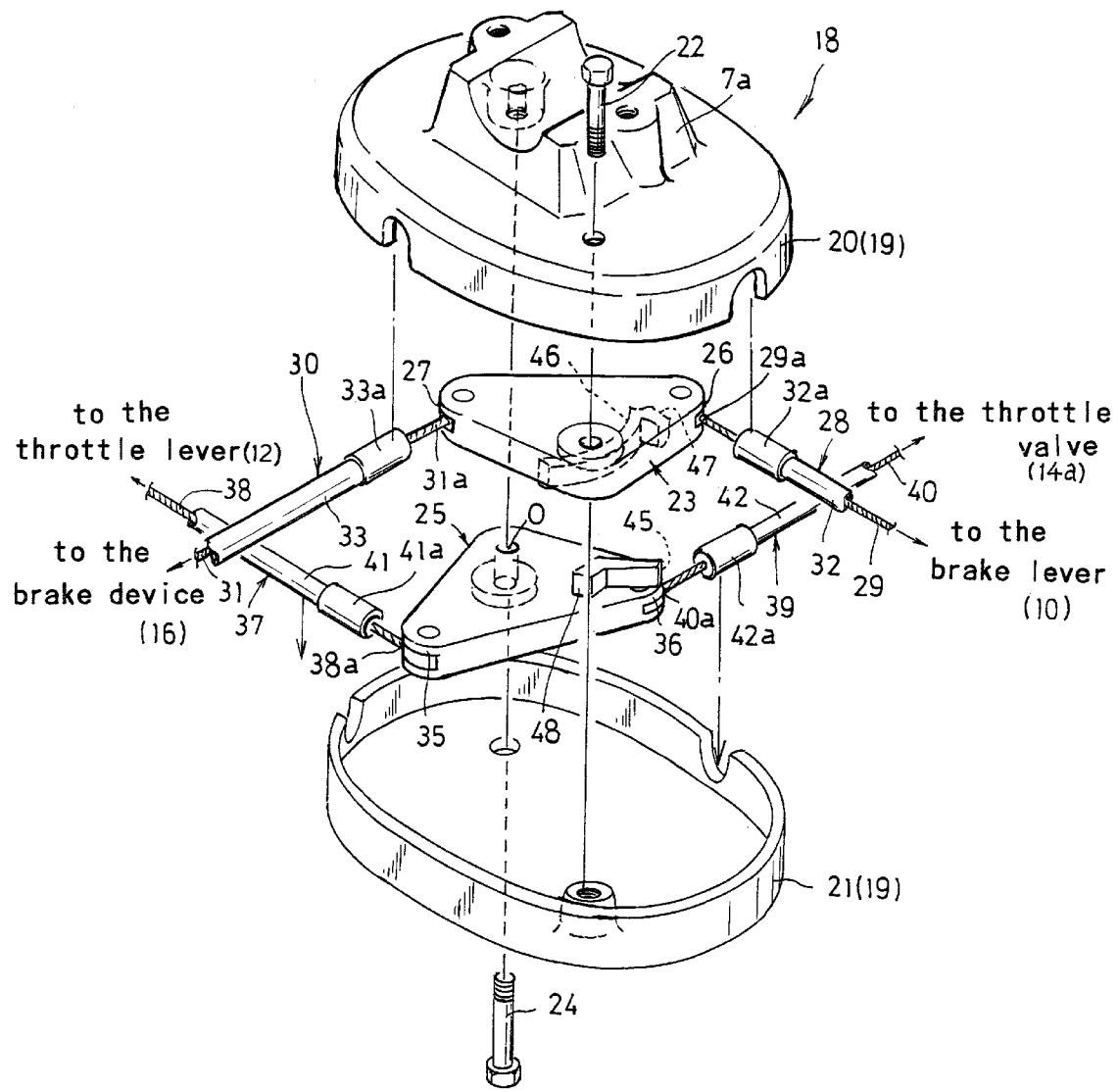
FIG. 3 is an exploded view of a control link mechanism between a throttle control system and a brake control system.

As shown in FIGS. 2 and 3, the control link mechanism 18 includes a first casing half 20 and a second casing half 21, which are engaged with each other in the vertical direction to form a housing 19. As shown in FIG. 3, the upper first casing half 20 has a first pivot shaft 22 that is also a case fastening bolt protruding downward in the casing half 20. A first triangle plate shaped swing member 23 of the brake manipulation system is attached pivotablly to the first pivot shaft 22.

On the other hand, the lower second casing half 21 has a second pivot shaft 24 that is also a case fastening bolt protruding upward in the second casing half 21, and a second triangle plate shaped swing member 25 of the output manipulation system is attached pivotablly to the second pivot shaft 24.

Both of the first swing member 23 for the brake manipulation system and the second swing member 25 of the output manipulation system are housed inside the housing 19. Therefore, swing movements of the both swing members 23 and 25 are not affected from outside, and do not disturb the working operation.

The housing 19 is formed by the combination of the first casing half 20 supporting the first swing member 23 of the brake manipulation system and the second casing half 21 supporting the second swing member 25 of the output manipulation system. Therefore, the assembling of the housing 19 is completed by supporting the first swing member 23 of the brake manipulation system by the first casing half 20, supporting the second swing member 25 of the output manipulation system by the second casing half 21, and combining the first casing half 20 and the second casing half 21 with each other followed by fastening them by the bolts 22 and 24. Thus, the assembling is performed easily.

The housing 19 is attached to a proper position of the manipulation rod 1 such as an under side of the rear portion, which can not disturb the working operation, by using proper fixing means. In addition, it is preferable that at least a part of the housing 19 is molded as a single unit with another member constituting the glass cutting machine, so that the molding and assembling make easy. In the present example, as shown in FIG. 2, the upper first casing half 20 of the housing 19 is molded as a single unit with a part 7a of the manipulation handle attachment member 7.

As shown in FIG. 3, the first swing member 23 of the brake manipulation system includes two swing edges 26 and 27 that swing perpendicularly with respect to the first pivot shaft 22 as a pivot center. The first swing edge 26 is connected to an end 29a of the inner wire 29 of a first brake manipulating Bowden cable 28 that constitutes the brake manipulating Bowden cable 15. The other end 29b of the inner wire 29 is connected to the brake lever 10 as shown in FIG. 1.

On the other hand, the second swing edge 27 of the first swing member 23 of the brake manipulation system is connected to an end 31a of the inner wire 31 of a second throttle manipulating Bowden cable 30 that constitutes the brake manipulating Bowden cable 15 (see FIG. 1) together with the first brake manipulating Bowden cable 28. The other end 31b of the inner wire 31 is connected to the brake shoe 17 that constitutes the brake device 16. Inner end portions 32a and 33a of outer tubes 32 and 33 of the first and the second brake manipulating Bowden cables 28 and 30 are fixed to the first casing half 20 by proper means respectively.

As mentioned above, the inner wires 29 and 31 of the brake manipulating Bowden cable 15 are normally pulled to the cutter blade 2 side by the force given to the brake shoe 17 in the direction toward the braking position. Therefore, the first swing member 23 of the brake manipulation system normally maintains the braking position shown in FIG. 4 when the brake lever 10 is released. When the operator moves the brake lever 10 in the brake releasing direction (e.g., such that the brake lever 10 approaches the left grip 9), the first swing member 23 of the brake manipulation system turns around the first pivot shaft 22 along with the movement of the first swing member 23 to become a releasing position shown in FIG. 5. When the operator release the brake lever 10, the first swing member 23 of the brake manipulation system turns in the opposite direction around the first pivot shaft 22 to return to the braking position shown in FIG. 4.

Furthermore, as shown in FIG. 3, the second swing member 25 of the output manipulation system includes two swing edges 35 and 36 that swing perpendicularly with respect to the second pivot shaft 24 as a pivot center. The first swing edge 35 is connected to an end 38a of the inner wire 38 of a first throttle manipulating Bowden cable 37 that constitutes the throttle manipulating Bowden cable 13. The other end 38b of the inner wire 38 is connected to the throttle lever 12 as shown in FIG. 1.

On the other hand, the second swing edge 36 of the second swing member 25 of the throttle manipulation system is connected to an end 40a of the inner wire 40 of a second throttle manipulating Bowden cable 39 that constitutes the throttle manipulating Bowden cable 13 (see FIG. 1) together with the first throttle manipulating Bowden cable 37. The other end 40b of the inner wire 40 is connected to the throttle valve 14a as shown in FIG. 1. Inner end portions 41a and 42a of outer tubes 41 and 42 of the first and the second throttle manipulating Bowden cables 37 and 39 are fixed to the second casing half 21 by proper means respectively.

Figure 4:
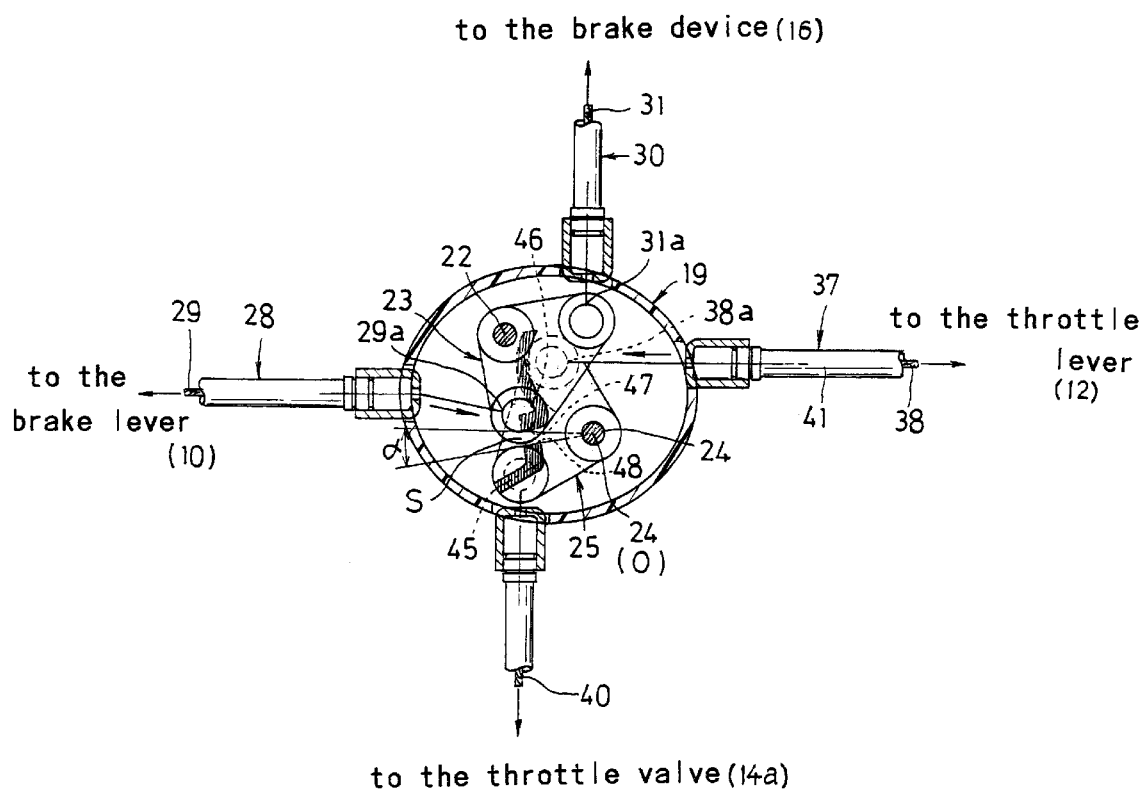
FIG. 4 illustrates the control link mechanism of the first example in a braked state.

The second swing member 25 of the throttle manipulation system normally maintains the non-outputting position shown in FIG. 4 when the throttle lever 12 is in the output stopping position. When the operator moves the throttle lever 12 in the output increasing direction, the second swing member 25 of the throttle manipulation system turns around the second pivot shaft 24 along with the movement of the second swing member 25 to become an outputting position shown in FIG. 5.

The first swing member 23 of the brake manipulation system and the second swing member 25 of the output manipulation system have a pair of brake manipulation restriction portions 45 and 46 and a pair of output manipulation restriction portions 47 and 48 for restricting the manipulation of the brake lever 10 in the braking direction or restricting the manipulation of the throttle lever 12 in the output increasing direction alternately, by contacting with each other at a predetermined timing to restrict the movement of the opposing member.

In other words, as shown in FIG. 3, the first swing member 23 of the brake manipulation system has a throttle lever movement restriction portion 47 protruding downward from the lower surface of the first swing member 23 as the output manipulation restriction portion. Corresponding to this, the second swing member 25 of the output manipulation system has a contact portion 48 protruding upward from the upper surface of the second swing member 25 so that the throttle lever movement restriction portion 47 abuts the contact portion 48. Therefore, even if the throttle lever 12 is mismanipulated in the output increasing direction with maintaining the brake device 16 in the braking position, the contact portion 48 of the second swing member 25 of the output manipulation system abuts the throttle lever movement restriction portion 47 of the first swing member 23 of the brake manipulation system. As a result, the throttle lever 12 cannot move so much that a rotation speed of the engine 3 exceeds a predetermined value and the centrifuge clutch 5 connects the power to the cutter blade 2 (see FIG. 4).

In the present example, as shown in FIG. 4, an engine start assist gap S is provided corresponding to a predetermined swing angle a of the second swing member 25 of the output manipulation system between the pair of output manipulation restriction portions 47 and 48. This gap S permits the throttle lever 12 to move a little in the output increasing direction so that the throttle valve 14a can move in the opening direction to the extent that the engine 3 can start smoothly though the power output to the cutter blade 2 does not start when the brake device 16 is in the braking state.

In this case, the brake lever 10 is released to make the cutter blade 2 in the braking state when the engine 3 starts. Then, the throttle lever 12 is manipulated in the output increasing direction in accordance with a necessity to open the throttle valve 14a, within the range corresponding to the engine start assist gap S. In this way, the engine 3 can start easily.

In addition, as shown in FIG. 3, the second swing member 25 of the throttle manipulation system has a brake lever movement restriction member 45 protruding upward from the upper surface of the second swing member 25 as the brake manipulation restriction portion. Corresponding to this, the first swing member 23 of the brake manipulation system has a contact portion 46 protruding downward from the lower surface of the first swing member 23 so that the throttle lever movement restriction member 45 abuts the contact portion 46. Therefore, even if the operator mismanipulates to release only the brake lever 10, the contact portion 46 of the first swing member 23 of the brake manipulation system abuts the brake lever movement restriction member 45 of the second swing member 25 of the throttle manipulation system. As a result, the brake lever 10 cannot move and the brake device 16 does not work.

Figure 5:
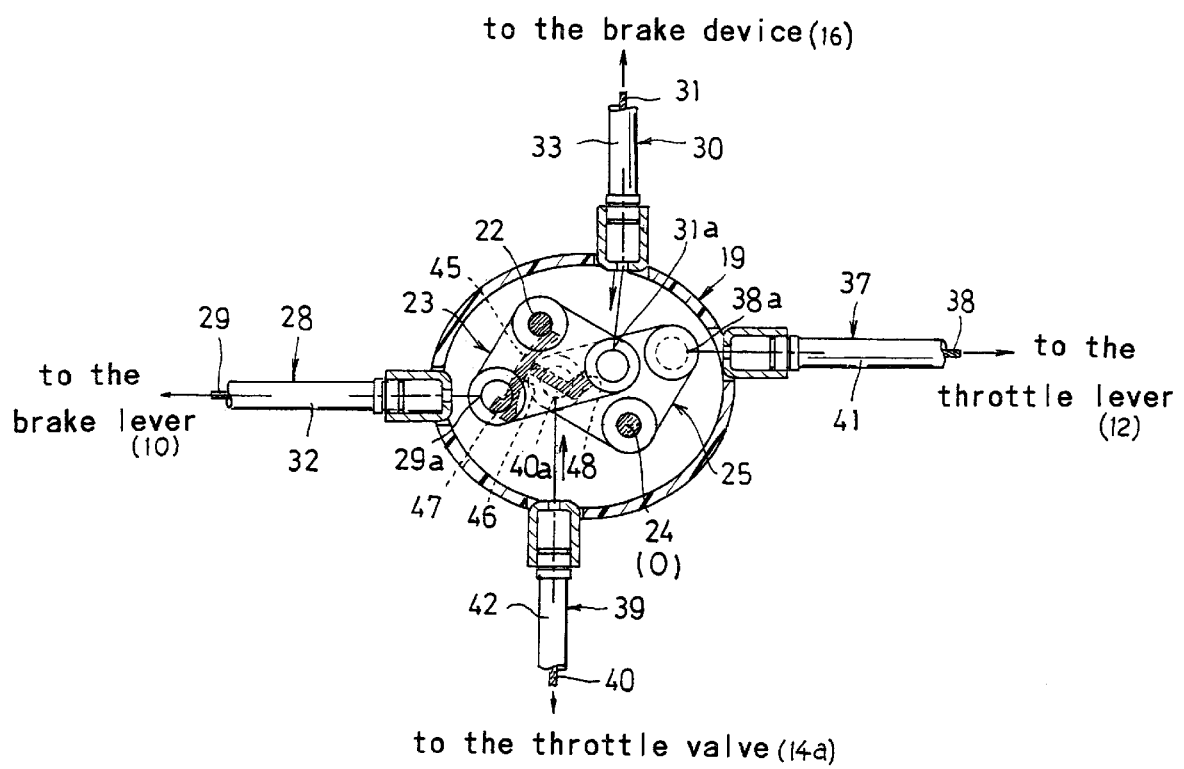
FIG. 5 illustrates the control link mechanism of the first example in an output state.
Figure 6:
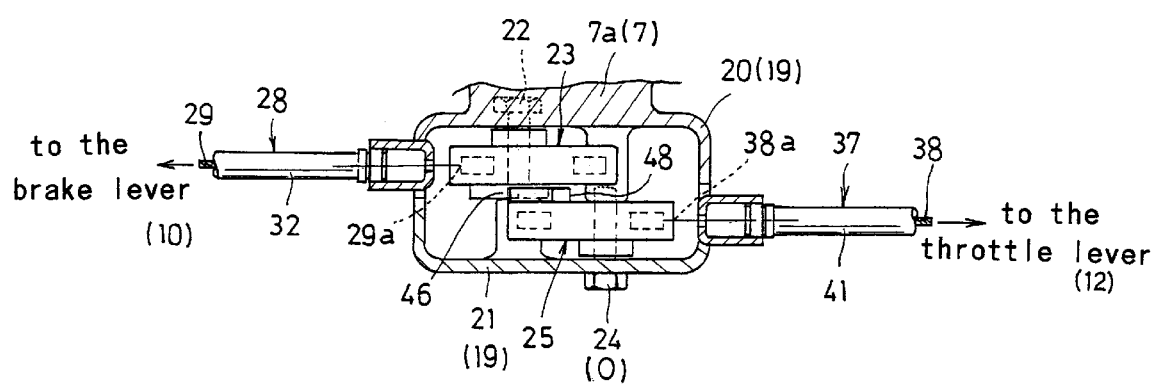
FIG. 6 is a section view corresponding to FIG. 5.

The contact portion 46 of the first swing member 23 of the brake manipulation system is formed in a partial circle shape whose center is a swing center 0 of the second swing member 25 of the throttle manipulation system when the first swing member 23 is in the releasing position shown in FIG. 5. Thus, the movement of the brake lever 10 is restricted over the whole range of the output power given to the cutter blade 2.

The operator uses the grass cutting machine having the above-mentioned structure according to the present invention as follows.

First, the operator does not touch the brake lever 10 when starting the engine 3, so the brake lever 10 is in the released state. In this condition, the starting operation can be performed safely since the brake device 16 is working.

The operator moves the throttle lever 12 in the output increasing direction according to a necessity, so as to perform the start operation of the engine 3 by a recoil starter 3a, for example. In this case, the throttle lever 12 moves by the swing a corresponding to the engine start assist gap S, and the throttle valve 14a opens a little more from the idling rotation opening degree, so that the engine 3 can start easily.

Under the condition in which the brake lever 10 is released to activate the brake device 16, the manipulation of the throttle lever 12 in the output increasing direction is restricted within the range corresponding to the engine start assist gap S since the pair of the output manipulation restriction portions 47, 48 abut to each other. Therefore, even if the operator want to move the throttle lever 12 largely in the output increasing direction, the throttle lever 12 can move only in the gap S, and the centrifuge clutch 5 does not connect the output power to the cutter blade 2.

When the engine 3 start and becomes in the idling state, the operator carries the grass cutting machine using the shoulder belt, and grips the brake lever 10 together with the left grip portion 9 of the manipulation handle 8 to release the cutter blade 2 from the brake device 16. Thus, the first swing member 23 of the brake manipulation system turns, and the throttle lever movement restriction portion 47 moves back, so that the throttle lever 12 can be manipulated freely in the output increasing direction.

Then, the operator can perform grass cutting by manipulating the throttle lever 12 in the output increasing direction to give a desired rotation output to the cutter blade 2, and by swinging the manipulation rod 1 using the manipulation handle 8.

Under the condition in which the throttle lever 12 is manipulated in the output increasing direction to give the power output to the cutter blade 2, the braking operation of the brake device 16 by releasing only the brake lever 10 is restricted when the pair of the brake manipulation restriction portions 45 and 46 contact with each other. Therefore, even if the operator mismanipulates to release the brake lever 10 during cutting operation, the brake device 16 does not work.

When stopping the power output to the cutter blade 2, the throttle lever 12 is moved back (released) to the output stopping position first, in which the centrifuge clutch 5 is disengaged. By this operation, the power output to the cutter blade 2 is stopped, and the brake lever movement restriction portion 45 of the second swing member 25 that constitutes the pair of brake manipulation restriction portions is moved backward, so that the brake lever 10 can be moved freely in the braking direction. Then, if the brake lever 10 is released, the brake device 16 works so that the rotation of the cutter blade 2 by the inertial force will be stopped quickly.

SECOND EXAMPLE

A second example of the present invention will be explained with reference to FIGS. 7 to 13. This second example shows another concrete example of the manipulation handle attachment member 7 and the control link mechanism 18. In the figures of this second example, the same reference numerals are used for the same elements as in the first example.

Figure 7:
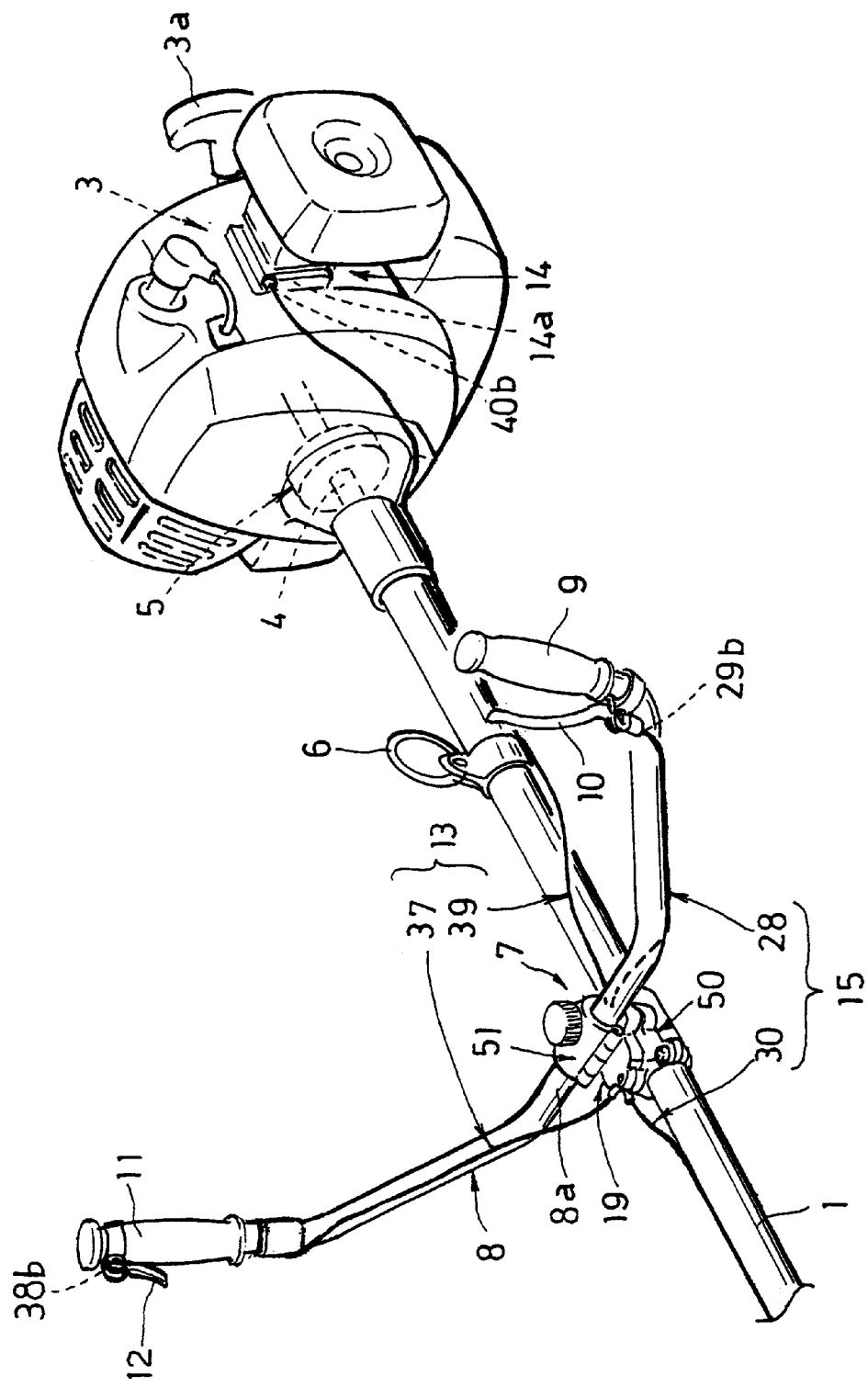
FIG. 7 is a perspective view of a principal part of a grass cutting machine as a second example of a power machine according to the present invention.
Figure 8:
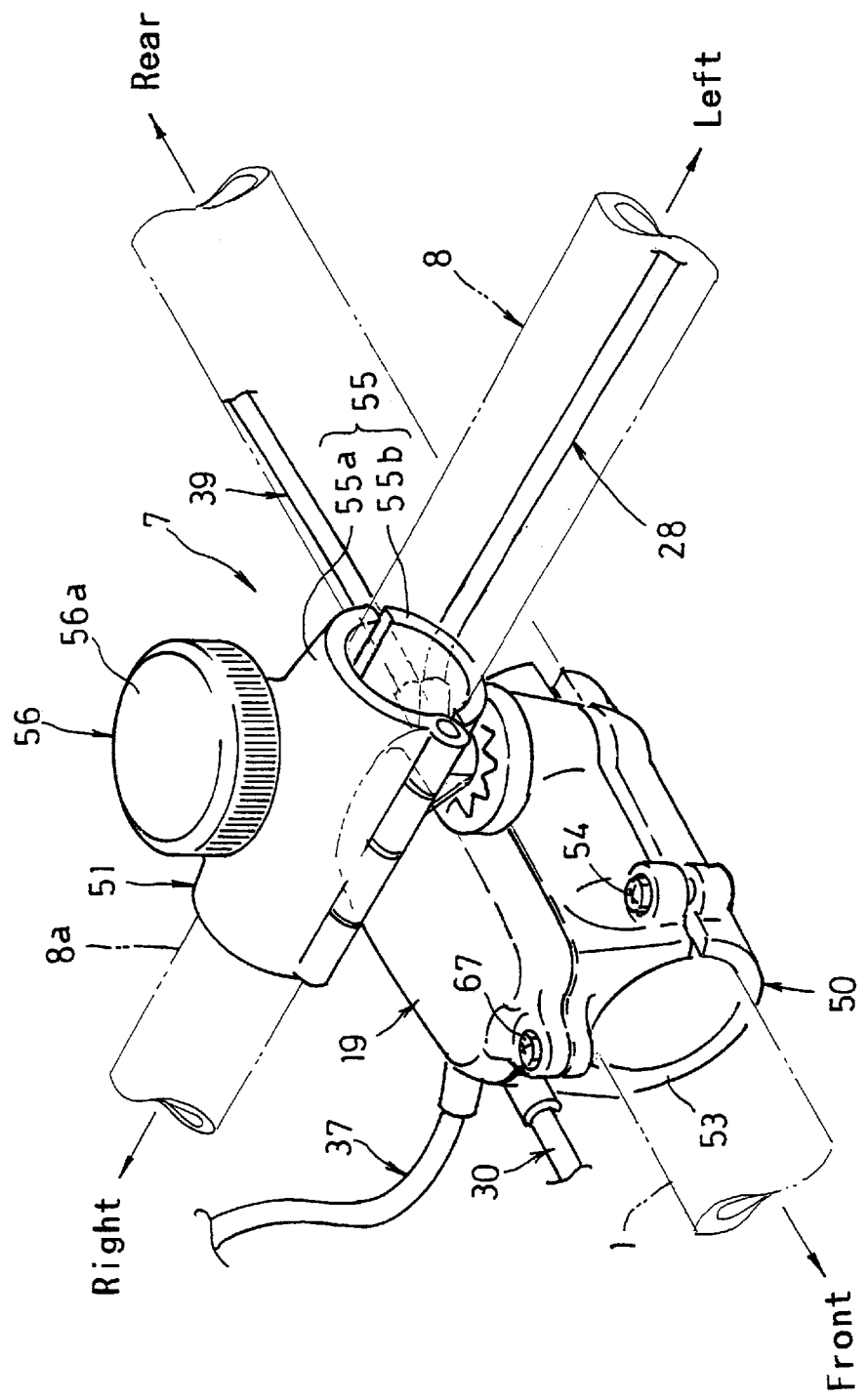
FIG. 8 is an enlarged perspective view of a connecting portion between a manipulation rod and a manipulation handle of the grass cutting machine shown in FIG. 7.

As shown in FIGS. 7 and 8, the manipulation handle attachment member 7 in this second example includes a manipulation rod side attachment member 50 and a manipulation handle side attachment member 51. Each of the manipulation rod side attachment member 50 and the manipulation handle side attachment member 51 is made of an aluminum alloy by die-casting, for example.

Figure 9:
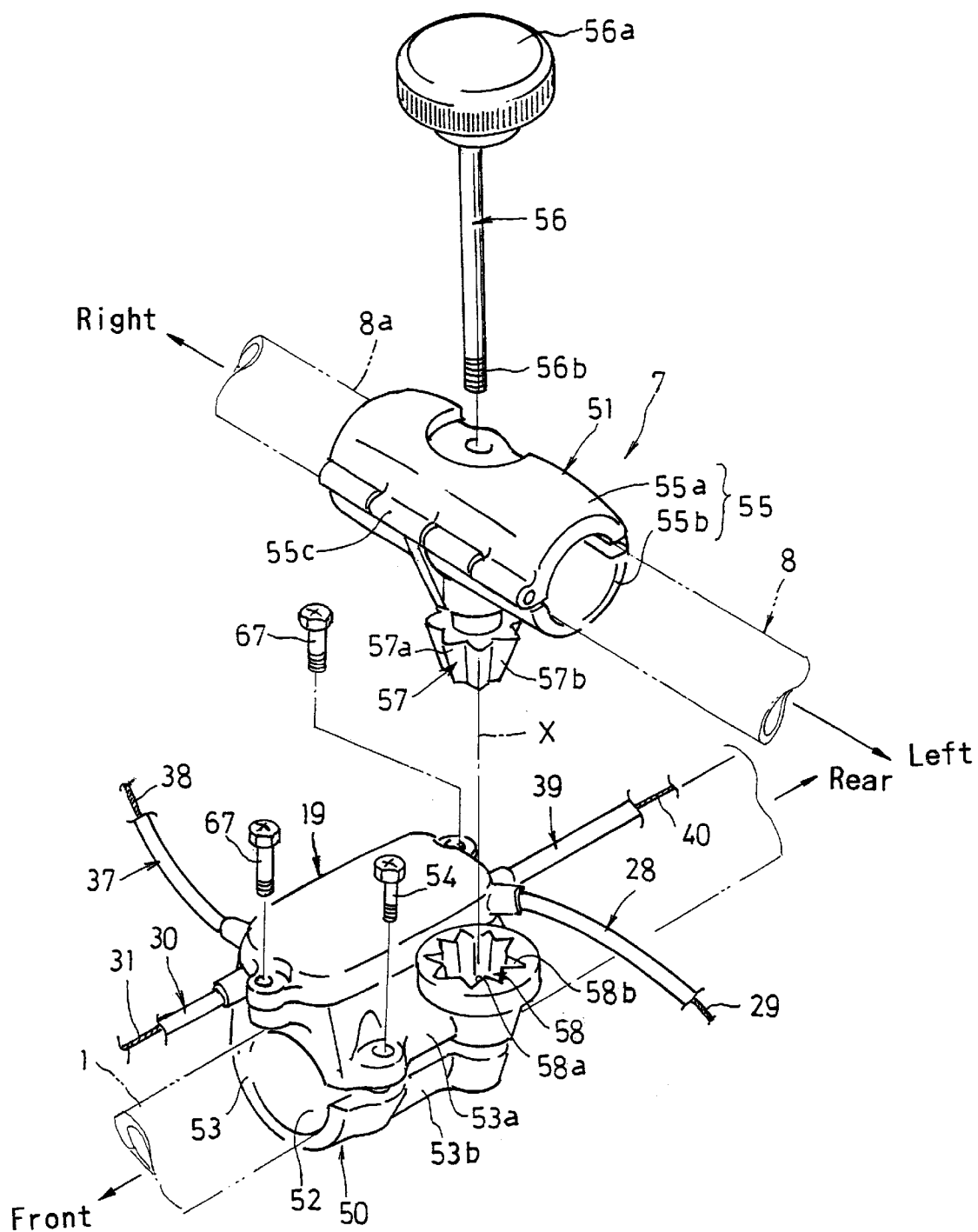
FIG. 9 is an exploded view of the connecting portion between the manipulation rod and the manipulation handle of the grass cutting machine shown in FIG. 7.

The manipulation rod side attachment member 50, as shown in FIG. 9, includes a manipulation rod receiving portion 53 having a through hole 52 for the manipulation rod 1 and a C-shaped section that has opening at the left side, and a manipulation rod receiving portion fastening bolt 54 for fastening the manipulation rod receiving portion 53 onto the manipulation rod 1. The manipulation rod receiving portion fastening bolt 54 is screwed from an upper edge portion 53a to a lower edge portion 53b of the manipulation rod receiving portion 53, which face each other. Thus, the upper and lower edge portions 53a and 53b are fastened to each other so that the manipulation rod side attachment member 50 is fixed to the manipulation rod 1.

On the other hand, the manipulation handle side attachment member 51 includes a manipulation handle receiving portion 55 and a manipulation handle receiving portion fastening bolt 56. In this example, as shown in FIG. 9, the manipulation handle receiving portion 55 comprises an upper member 55a and a lower member 55b, each of which has a half ring section and connected with each other by a hinge 55c disposed at the front side. The upper member 55a and the lower member 55b hold the linear middle portion 8a of the manipulation handle 8 (see FIG. 7) by sandwiching them vertically, and fastened by the fastening bolt 56. If the manipulation handle 8 can be separated into left and right parts, the manipulation handle receiving portion 55 is not required to comprise hinged upper and lower members since the manipulation handle 8 can be inserted into the manipulation handle receiving portion 55. In this case, the manipulation handle side attachment member 51 may be a tubular shape having a C-shaped section similar to the manipulation rod side attachment member 50. On the contrary, the manipulation rod side attachment member 50 can be structured to comprise hinged upper and lower members similarly to the manipulation handle side attachment member 51.

In this example shown in the figure, the manipulation handle receiving portion fastening bolt 56 is also a fastening bolt for assembling the manipulation handle attachment member 51, i.e., fixing the manipulation handle side attachment member 51 and the manipulation rod side attachment member 50 removably and vertically with each other. The fastening bolt 56 has a grip portion 56a that facilitate rotation. When the manipulation handle receiving portion fastening bolt (manipulation handle attachment member assembly fastening bolt) 56 is inserted from above and penetrates the opposing edge portions of the manipulation handle receiving portion 55 to screw into the manipulation rod side attachment member 50, the manipulation handle receiving portion 55 is fixed to the manipulation handle 8, and the manipulation handle side attachment member 51 is fixed to the manipulation rod side attachment member 50.

In this example shown in the figure, the lower end 56b of the manipulation handle receiving portion fastening bolt 56 penetrates the upper edge portions 53a of the manipulation rod side attachment member 50 to screw into the lower edge portion 53b, so that the manipulation rod receiving portion 53 of the manipulation rod side attachment member 50 is also fastened by the manipulation handle receiving portion fastening bolt 56.

The angle between the manipulation handle side attachment member 51 and the manipulation rod side attachment member 50 can be changed with respect to the center vertical axis X by loosing the manipulation handle receiving portion fastening bolt 56. Thus, as shown in FIG. 10, the manipulation handle 8 is turned and fixed to be almost parallel with the manipulation rod 1 so that the grass cutting machine can be compact and easy to handle when storing or transporting it.

In this example, as shown in FIG. 9, the manipulation handle side attachment member 51 and the manipulation rod side attachment member 50 have engaging portions 57a–58a, 57b–58b . . . distributing around the axis X. Since plural engaging portions 57a–58a, 57b–58b, . . . are engaged with each other at a plurality of predetermined angle positions, the angle between the manipulation rod 1 and the manipulation handle 8 can be changed easily to a predetermined angle position with avoiding a position shift between the manipulation handle side attachment member 51 and the manipulation rod side attachment member 50. In this illustrated example, the upper side manipulation handle side attachment member 51 is provided with a tapered convex portion 57 protruding downward and having a horizontal section of nine tipped regular star, while the lower side manipulation rod side attachment member 50 is provided with a concave portion 58 corresponding to the tapered convex portion 57, so that the plural engaging portions 57a and 58a, 57b and 58b, . . . are formed. In this case, since the tapered convex portion 57 having the nine tipped regular star section and the concave portion 58 are engaged tightly with each other, the manipulation handle side attachment member 51 and the manipulation rod side attachment member 50 can be fixed to each other tightly with a relatively small force.

Figure 10:
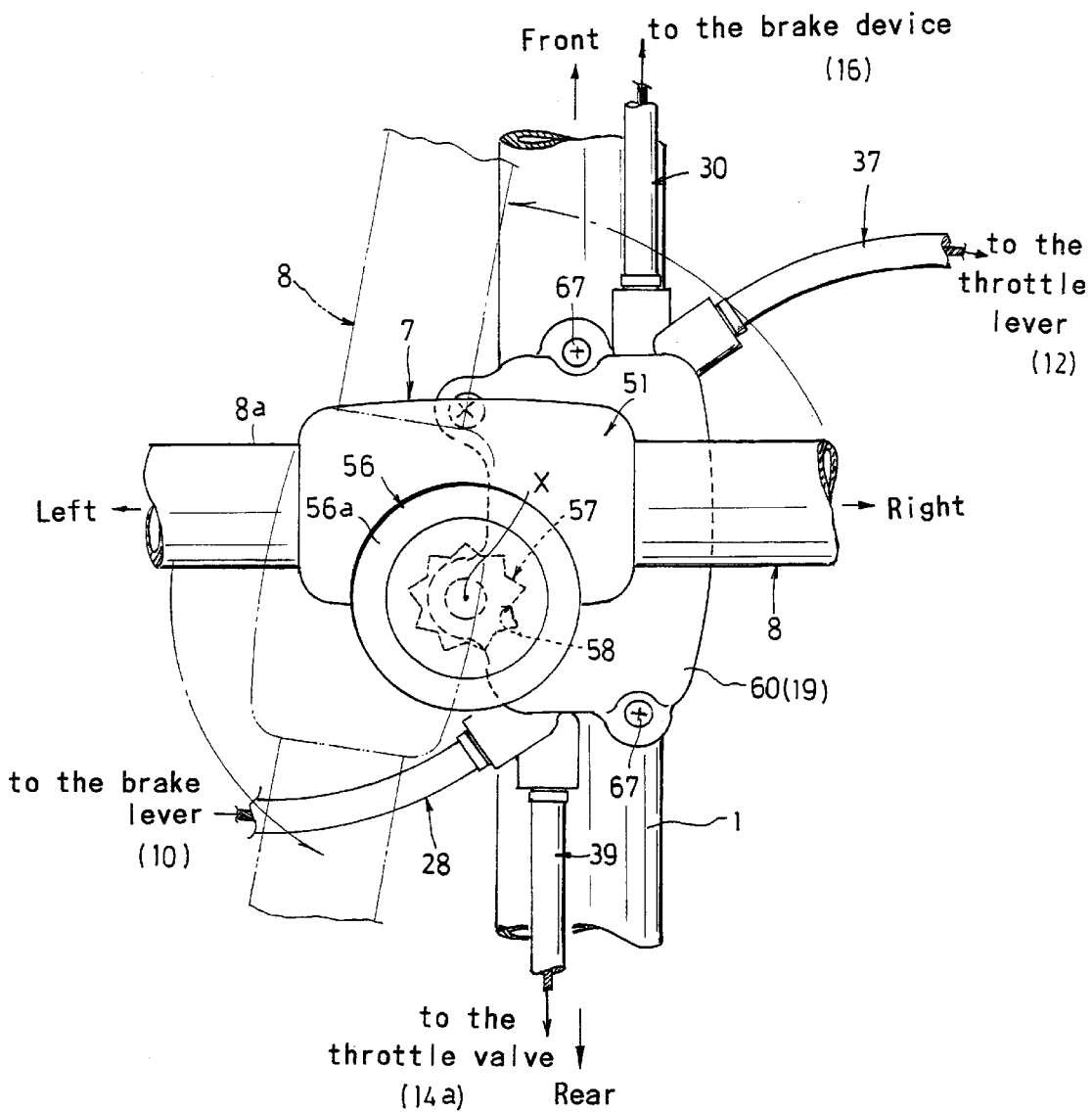
FIG. 10 is a plan view of the connecting portion between the manipulation rod and the manipulation handle of the grass cutting machine shown in FIG. 7.

In this illustrated example, the maximum angle between the manipulation rod 1 and the manipulation handle 8 is 80 degrees as shown in FIG. 10.

Next, the control link mechanism 18 in the second example is explained below.

Figure 11:
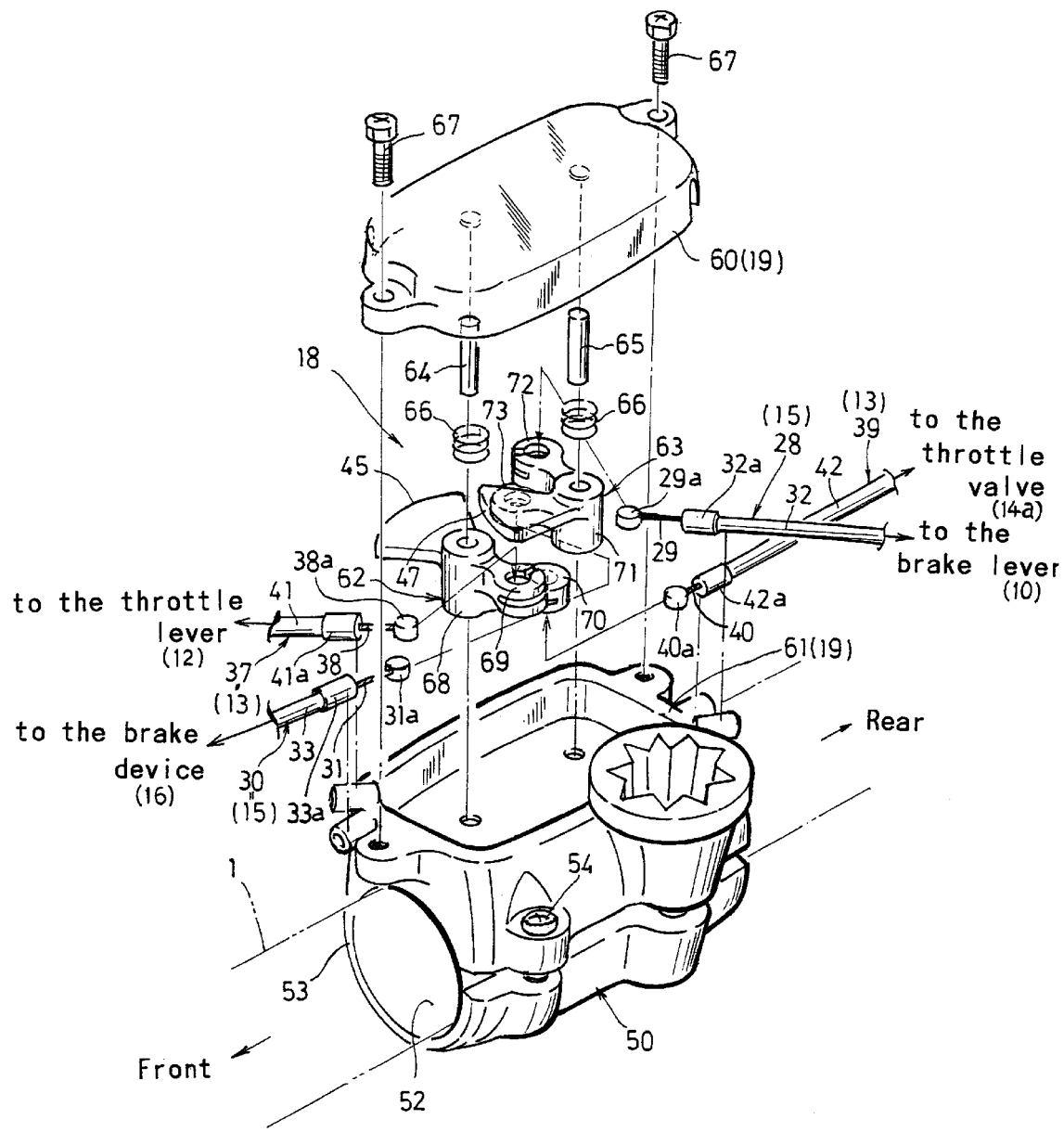
FIG. 11 is an exploded view of a control link mechanism according to a second example.

This control link mechanism 18 includes an upper casing half 60 and a lower casing half 61, which are engaged with each other to form the housing 19 as shown in FIG. 11 that is an exploded view of the manipulation rod side attachment member 50. In the same manner as in the first example, a part of the housing 19 (i.e., the lower casing half 61 in the illustrated example) is molded as a single unit with the manipulation handle attachment member 7 (i.e., the manipulation rod side attachment member 50 in the illustrated example).

In the housing 19, an output manipulation gang member 62 and a brake manipulation gang member 63 are supported pivotably. The output manipulation gang member 62 works corresponding to the manipulation of the throttle lever 12 (see FIG. 7) attached to the top end portion of the right grip portion 11 of the manipulation handle 8, while the brake manipulation gang member 63 works corresponding to the manipulation of the brake lever 10 (see FIG. 7) attached to the lower end portion of the left grip portion 9 of the manipulation handle 8.

In this example, the output manipulation gang member 62 and the brake manipulation gang member 63 are arranged in the direction along the manipulation rod 1 (from the front to the rear), and are disposed adjacent to the manipulation rod 1. Thus, a protrusion due to the output manipulation gang member 62 and the brake manipulation gang member 63 is suppressed to as small as possible, so that the contour of the grass cutting machine can be slim and the easiness of operation can be improved.

The output manipulation gang member 62 and the brake manipulation gang member 63 are supported pivotably in the horizontal plane by each gang member supporting shaft 64 and 65. After a compression spring 66 is placed to each gang member supporting shaft 64 and 65, the upper casing half 60 is capped over the lower casing half 61. The upper casing half 60 and the lower casing half 61 are fixed to each other by casing half fixing bolts 67 and 67. Thus, the output manipulation gang member 62 and the brake manipulation gang member 63 are supported pivotably in the horizontal plane within the housing 19.

As shown in FIG. 11, the front side output manipulation gang member 62 includes a hub portion 68 for receiving the output manipulation gang member supporting shaft 64 rotatably and two swing edge portions 69 and 70 molded as a single unit with the hub portion 68 and shifted in position from each other horizontally and vertically. The first swing edge portion 69 is connected to an end 38a of the inner wire 38 of the first throttle manipulating Bowden cable 37 that constitutes the throttle manipulating Bowden cable 13, while the other end 38b of the inner wire 38 is connected to the throttle lever 12 as shown in FIG. 7.

On the other hand, the second swing edge portion 70 of the output manipulation gang member 62 is connected to an end 40a of the inner wire 40 of the second throttle manipulating Bowden cable 39 that constitutes the throttle manipulating Bowden cable 13 together with the first throttle manipulating Bowden cable 37, while the other end 40b of the inner wire 40 is connected to the throttle valve 14a of the carburetor 14 as shown in FIG. 7. Inner end portions 41a and 42a of outer tubes 41 and 42 of the first and the second throttle manipulating Bowden cables 37 and 39 are fixed to the lower casing half 61 by proper means respectively as shown in FIG. 11.

Figure 12:
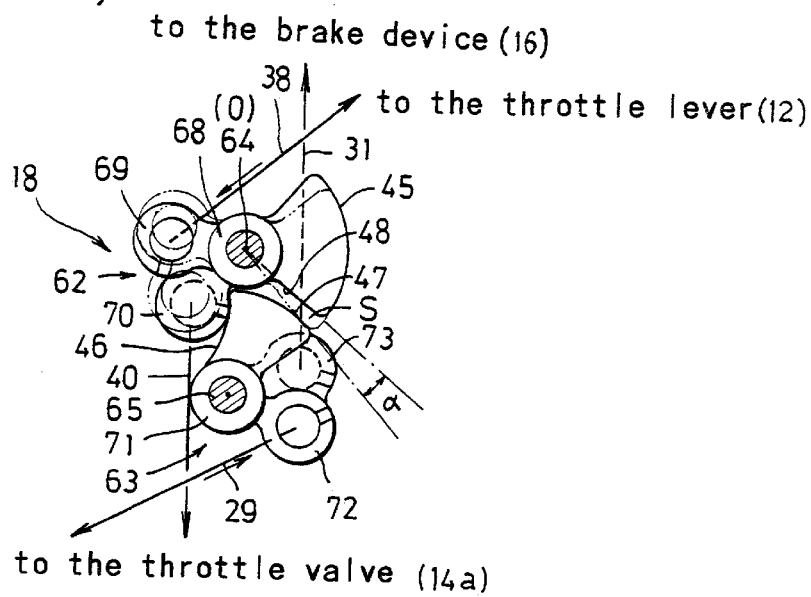
FIG. 12 illustrates the control link mechanism of the second example in a braked state.

When the throttle lever 12 is in the output stopping (released) position, the output manipulation gang member 62 maintains the idling rotation position shown in FIG. 12 by the force applied to the throttle valve 14a from an unshown restoring spring in the direction to the idling rotation opening degree. When the operator moves the throttle lever 12 in the output increasing direction, the output manipulation gang member 62 turns in the clockwise direction viewed from above around the output manipulation gang member supporting shaft 64 corresponding to the movement of the throttle lever 12, so as to become in the output position shown in FIG. 13. When the operator release the throttle lever 12 back to the output stopping position, the output manipulation gang member 62 turns in the opposite direction (in the counterclockwise direction viewed from above) around the gang member supporting shaft 64 by the force applied to the throttle valve 14a in the direction to the idling rotation opening degree, and returns to the idling rotation position shown in FIG. 12.

As shown in FIG. 11, the rear side brake manipulation gang member 63 also includes a hub portion 71 for receiving the brake manipulation gang member supporting shaft 65 rotatably and two swing edge portions 72 and 73 molded as a single unit with the hub portion 71 and shifted positions from each other horizontally and vertically. The first swing edge portion 72 is connected to an end 29a of the inner wire 29 of the first brake manipulating Bowden cable 28 that constitutes the brake manipulating Bowden cable 15, while the other end 29b of the inner wire 29 is connected to the brake lever 10 as shown in FIG. 7.

On the other hand, the second swing edge portion 73 of the brake manipulation gang member 63 is connected to an end 31a of the inner wire 31 of the second throttle manipulating Bowden cable 30 that constitutes the brake manipulating Bowden cable 15 together with the first brake manipulating Bowden cable 28, while the other end 31b of the inner wire 31 is connected to the brake shoe 17 that constitutes the brake device 16 in the same way as in the first example (see FIG. 1). Inner end portions 32a and 33a of outer tubes 32 and 33 of the first and the second brake manipulating Bowden cables 28 and 30 are fixed to the lower casing half 61 by proper means respectively as shown in FIG. 11.

The inner wires 29 and 31 of the brake manipulating Bowden cable 15 are normally pulled to the cutter blade 2 side by the force given to the brake shoe 17 in the direction toward the braking position. Therefore, the brake manipulation gang member 63 maintains the braking position shown in FIG. 12 when the brake lever 10 is released. When the operator grips the brake lever 10 together with the left grip 9, the brake manipulation gang member 63 turns in the counter clockwise direction around the brake manipulation gang member supporting shaft 65 viewed from above corresponding to the movement of the brake lever 10 to become in the releasing position shown in FIG. 13. When the operator release the brake lever 10, the brake manipulation gang member 63 turns in the opposite direction around the brake manipulation gang member supporting shaft 65 to return to the braking position shown in FIG. 12.

In order to prevent an interference between the inner wires 31-38, 29-40 (see FIG. 12) in the housing 19, which are transmission members extending from the output manipulation gang member 62 and the brake manipulation gang member 63 in the direction of crossing with each other viewed from above, the positions of the swing edge portions 69-73, 72-70 of the output and the brake manipulation gang members 62 and 63 are shifted from each other. Thus, since the inner wires 31-38, 29-40 do not contact with each other in the housing 19, the manipulation forces can be transmitted smoothly to the output and the brake manipulation gang members 62 and 63, and the inner wires 31, 38, 29 and 40 are prevented from abrasion.

The output and the brake manipulation gang members 62 and 63 have a pair of brake manipulation restriction portion 45 and 46, and a pair of output manipulation restriction portion 47 and 48 respectively, similarly to the first example. They abut to each other at a predetermined timing to restrict the movement of the opposing member, so that the manipulation of the brake lever 10 in the braking direction and the manipulation of the throttle lever 12 in the output increasing direction are restricted alternately.

Figure 13:
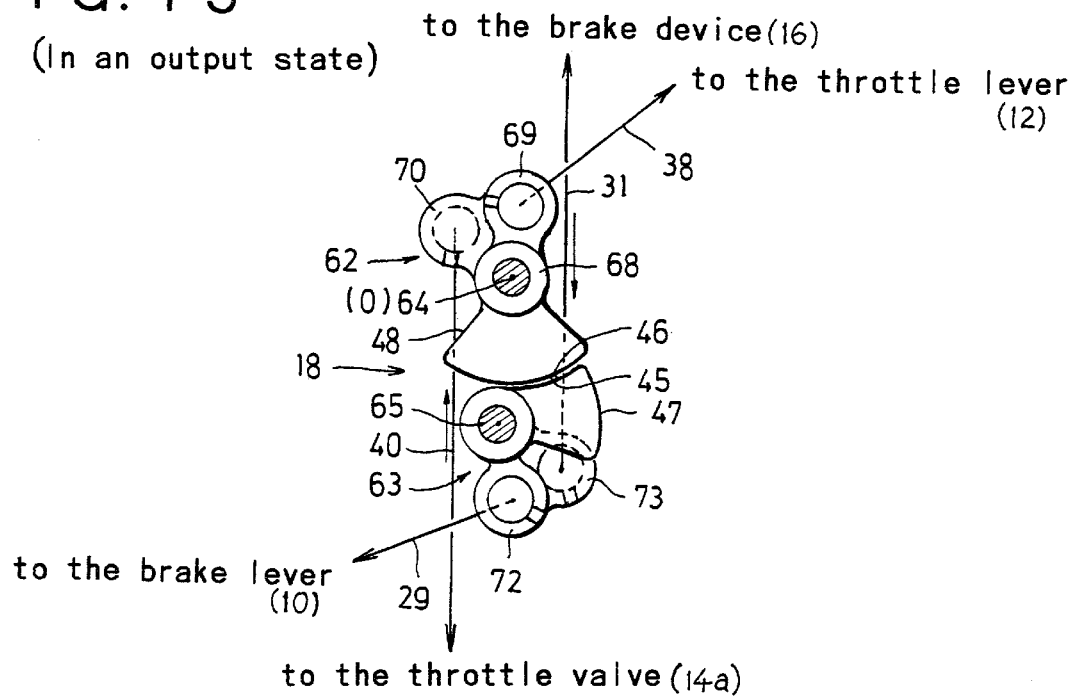
FIG. 13 illustrates the control link mechanism of the second example in an output state.

In other words, as an output manipulation restriction portion, as shown in FIG. 12, the brake manipulation gang member 63 is provided with a throttle lever movement restriction portion 47 that is located within the rotation range of the output manipulation gang member 62 when the brake manipulation gang member 63 is in the braking position shown in FIG. 12, and moves out of the rotation range of the output manipulation gang member 62 when the brake manipulation gang member 63 is transferred to the releasing position shown in FIG. 13. The throttle lever movement restriction portion 47 is integrated with the hub portion 71. On the other hand, the output manipulation gang member 62 is provided with a contact portion 48 that abuts the throttle lever movement restriction portion 47. Therefore, when the cutter blade 2 is in braked state by the brake device 16, even if the throttle lever 12 is mismanipulated to move in the output increasing direction, the contact portion 48 of the output manipulation gang member 62 abuts the throttle lever movement restriction portion 47 of the brake manipulation gang member 63. As a result, the throttle lever 12 cannot move so much that a rotation speed of the engine 3 increases and the centrifuge clutch 5 connects the power output to the cutter blade 2.

In this second example too, an engine start assist gap S is provided corresponding to a predetermined swing angle a of the output manipulation gang member 62 between the pair of output manipulation restriction portions 47 and 48 as shown in FIG. 12.

As the brake manipulation restriction portion, as shown in FIG. 13, the output manipulation gang member 62 is provided with a brake lever movement restriction portion 45 that is located within the rotation range of the brake manipulation gang member 63 when the output manipulation gang member 62 is in the output position shown in FIG. 13, and moves out of the rotation range of the brake manipulation gang member 63 when the output manipulation gang member 62 is transferred to the idling rotation position shown in FIG. 12. On the other hand, the brake manipulation gang member 63 is provided with a contact portion 46 that abuts the brake lever movement restriction member 45. Therefore, when the throttle valve 14a is opened so that the centrifuge clutch 5 connects the power output to the cutter blade 2, even if the operator mismanipulate to release only the brake lever 10, the contact portion 46 of the brake manipulation gang member 63 abuts the brake lever movement restriction member 45 of the output manipulation gang member 62. As a result, the brake lever 10 cannot move so much that the brake device 16 works.

The brake lever movement restriction member 45 of the output manipulation gang member 62 has a sector shape with a center of the swing center of the output manipulation gang member 62, so that the movement of the brake lever 10 is restricted over the whole range of the output power given to the cutter blade 2.

In this second example, as shown in FIG. 8, the housing 19 of the control link mechanism 18 is disposed between the manipulation handle 8 and the manipulation rod 1. In this way, since the throttle manipulating Bowden cable 13 and the brake manipulating Bowden cable 15 extend from the housing 19 at the position close to the manipulation handle 8 and the manipulation rod 1 as shown in FIG. 7, the easiness of the cutting operation is improved without a problem such as tangling of grass or tree around the throttle manipulating Bowden cable 13 or the brake manipulating Bowden cable 15 adjacent to the manipulation handle attachment member 7 during the cutting operation.

In the illustrated example, it is desirable that the manipulation handle 8 is turned in the counter clockwise direction viewed from above as shown in FIG. 10 when the grass cutting machine is stored or transported. Thus, the first throttle manipulating Bowden cable 37 and the first brake manipulating Bowden cable 28 are not provided with an excessive tension when the manipulation handle 8 is turned. In the illustrated example, the first throttle manipulating Bowden cable 37 extends from the front right side of the housing 19 in the right and front direction viewed from above, so as to reach the throttle lever 12 attached to the manipulation handle 8. The first brake manipulating Bowden cable 28 extends from the rear left side of the housing 19 in the left and rear direction viewed from above, so as to reach the brake lever 10 attached to the manipulation handle 8. Therefore, it is desirable to turn the manipulation handle 8 in the counter clockwise direction viewed from above when storing or transporting the machine.

Other structures and actions in this second example are the same as the first example, so the explanation of them is eliminated.

THIRD EXAMPLE

A third example of the present invention will be explained with reference to FIGS. 14 to 19. In the figures of this third example, the same reference numerals are used for the same elements as in the first or the second example.

Figure 14:
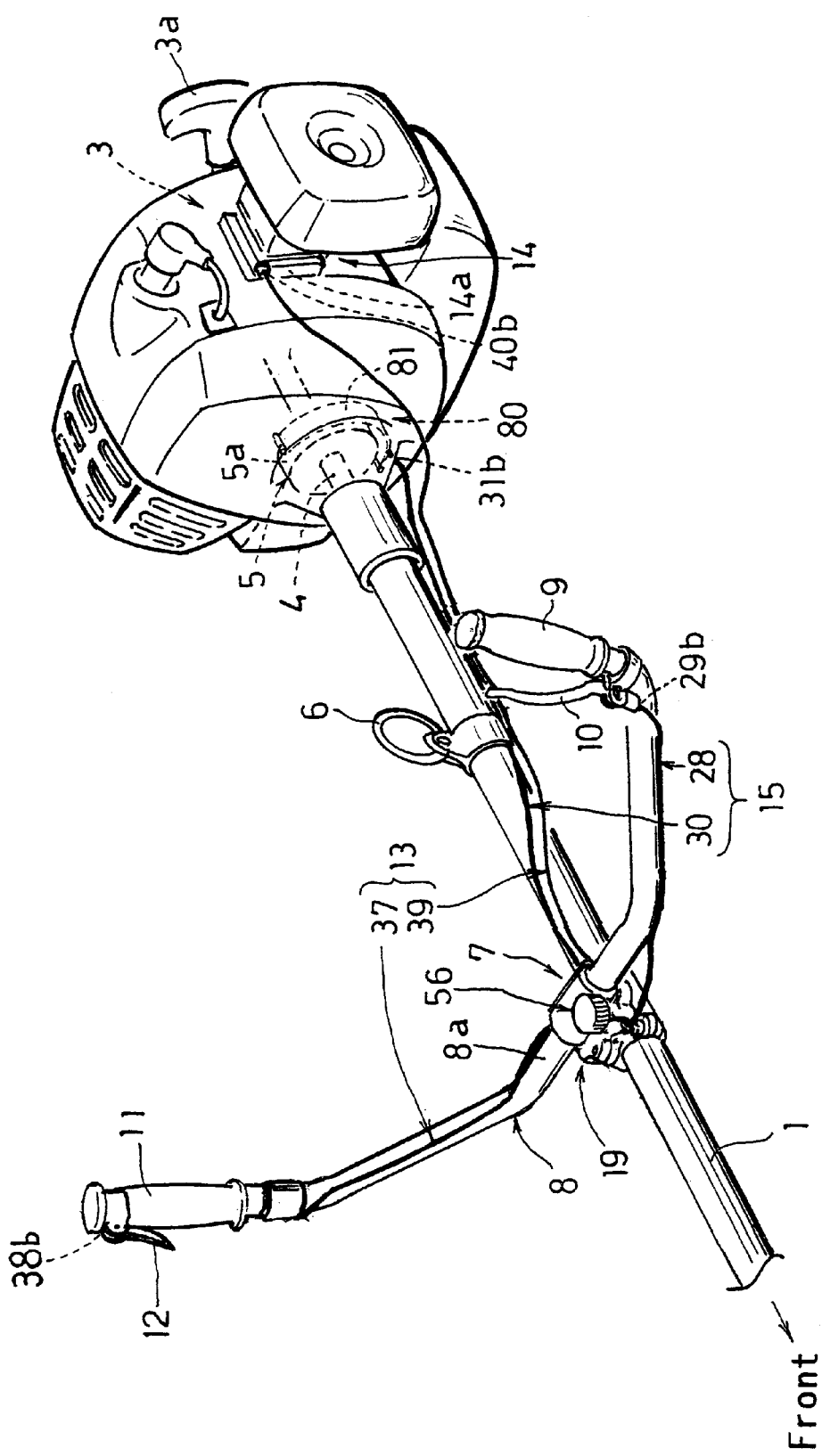
FIG. 14 is a perspective view of a principal part of a grass cutting machine as a third example of a power machine according to the present invention.

This third example is a variation of the second example, in which the brake device 80 is provided to the engine 3 side. As shown in FIG. 14, the brake shoe 81 of the brake device 80 in the grass cutting machine of this third example is normally pressed to contact with a clutch drum 5a of the centrifuge clutch 5, for example. The inner wires 29 and 31 of the brake manipulating Bowden cable 15 (see FIG. 15) are normally pulled to the centrifuge clutch 5 side by the force given to the brake shoe 81 in the direction toward the braking position. When the brake lever 10 is released, the brake shoe 81 is contacted with the outer surface of the clutch drum 5a, so that the cutter blade is in the braked state. When the operator grips the brake lever 10 with the left grip 9 of the manipulation handle 8, the inner wires 29 and 31 of the brake manipulating Bowden cable 15 are pulled to the brake lever 10 side, so that the brake shoe 81 moves away form the outer surface of the clutch drum 5a to the releasing position.

In this third example, since the brake device 80 is disposed at the engine 3 side, the second throttle manipulating Bowden cable 30 that constitutes the brake manipulating Bowden cable 15 extends from the housing 19 of the control link mechanism 18 in which a brake manipulation gang member 83 and an output manipulation gang member 82 are disposed neighboring front to rear, and in the rear direction. Therefore, the shapes of the output manipulation gang member 82, the brake manipulation gang member 83, and the housing 19 are different from the second example.

Figure 16:
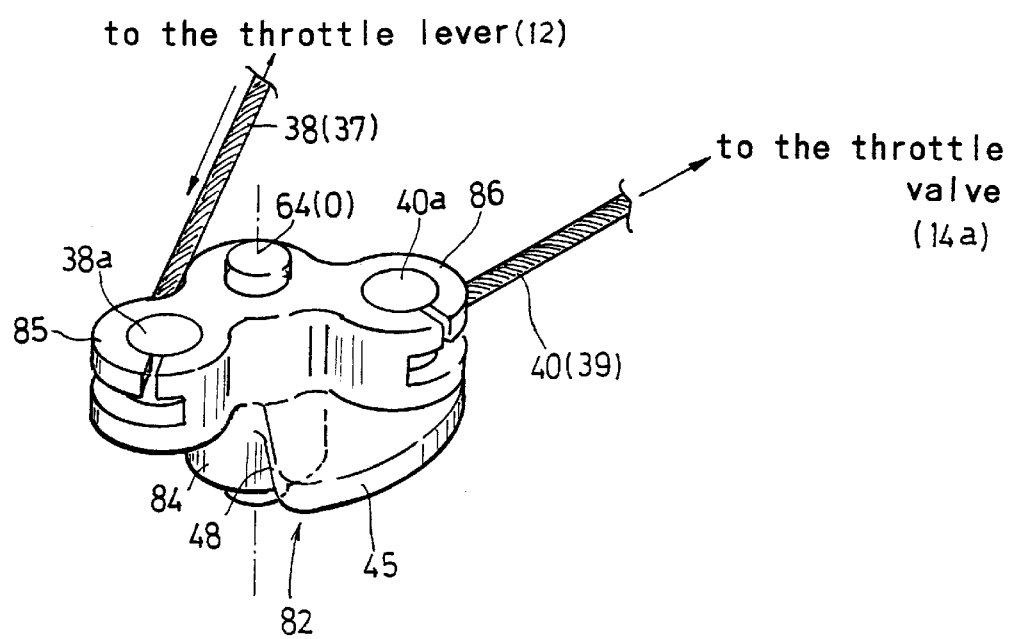
FIG. 16 is an enlarged perspective view of an output manipulation gang member according to the third example.

As shown in FIG. 16, the rear side output manipulation gang member 82 includes a hub portion 84 for receiving the output manipulation gang member supporting shaft 64 rotatably and two swing edge portions 85 and 86 molded as a single unit with the hub portion 84 and shifted in position from each other horizontally and vertically. The first swing edge portion 85 is connected to an end 38a of the inner wire 38 of the first throttle manipulating Bowden cable 37 that constitutes the throttle manipulating Bowden cable 13, while the other end 38b of the inner wire 38 is connected to the throttle lever 12 as shown in FIG. 14.

Figure 15:
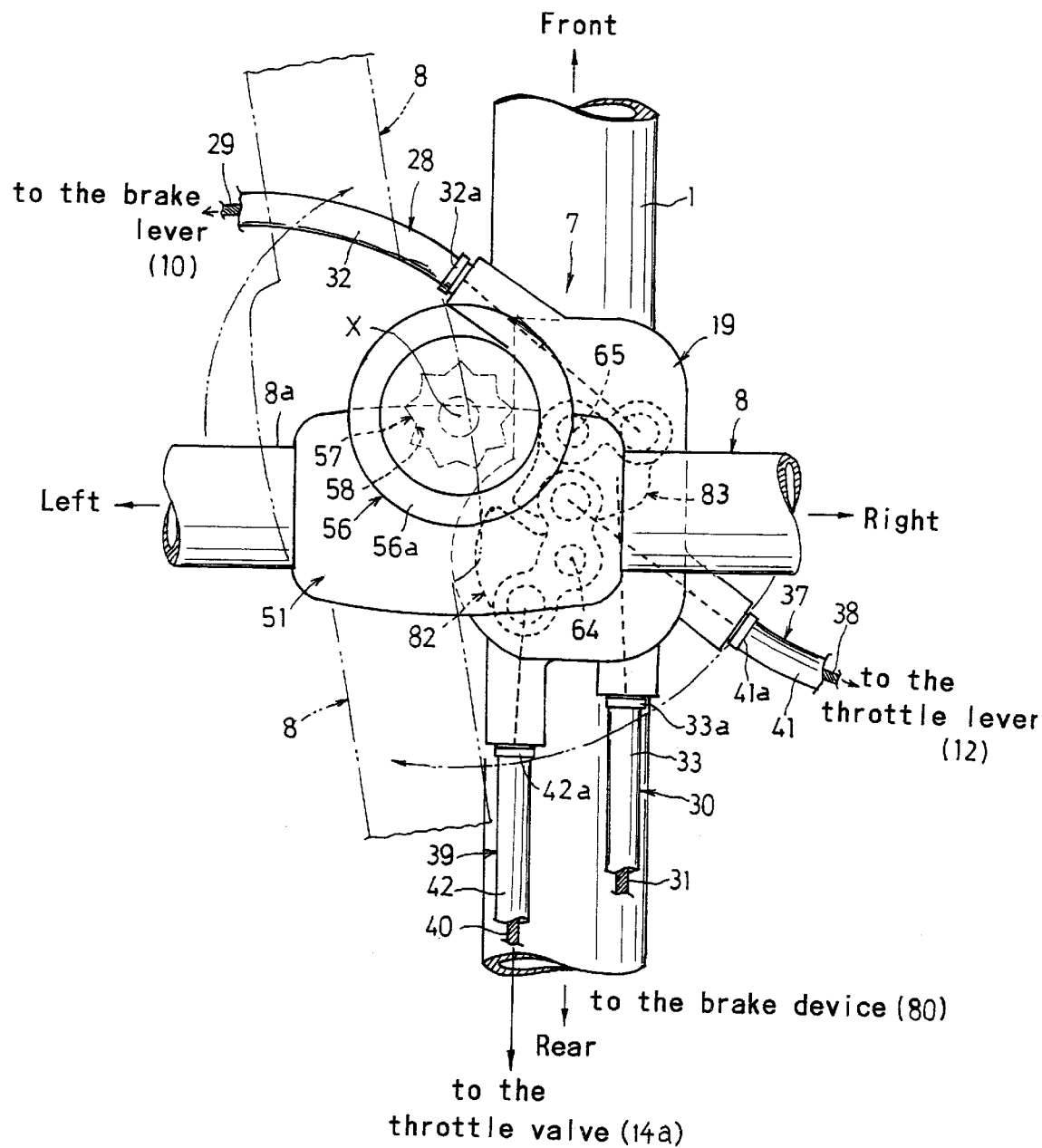
FIG. 15 is a plan view of the connecting portion between the manipulation rod and the manipulation handle of the grass cutting machine shown in FIG. 14.

On the other hand, the second swing edge portion 86 of the output manipulation gang member 82 is connected to an end 40a of the inner wire 40 of the second throttle manipulating Bowden cable 39 that constitutes the throttle manipulating Bowden cable 13 together with the first throttle manipulating Bowden cable 37, while the other end 40b of the inner wire 40 is connected to the throttle valve 14a of the carburetor 14 as shown in FIG. 14. Inner end portions 41a and 42a of outer tubes 41 and 42 of the first and the second throttle manipulating Bowden cables 37 and 39 are fixed to the housing 19 by proper means respectively as shown in FIG. 15.

Figure 18:
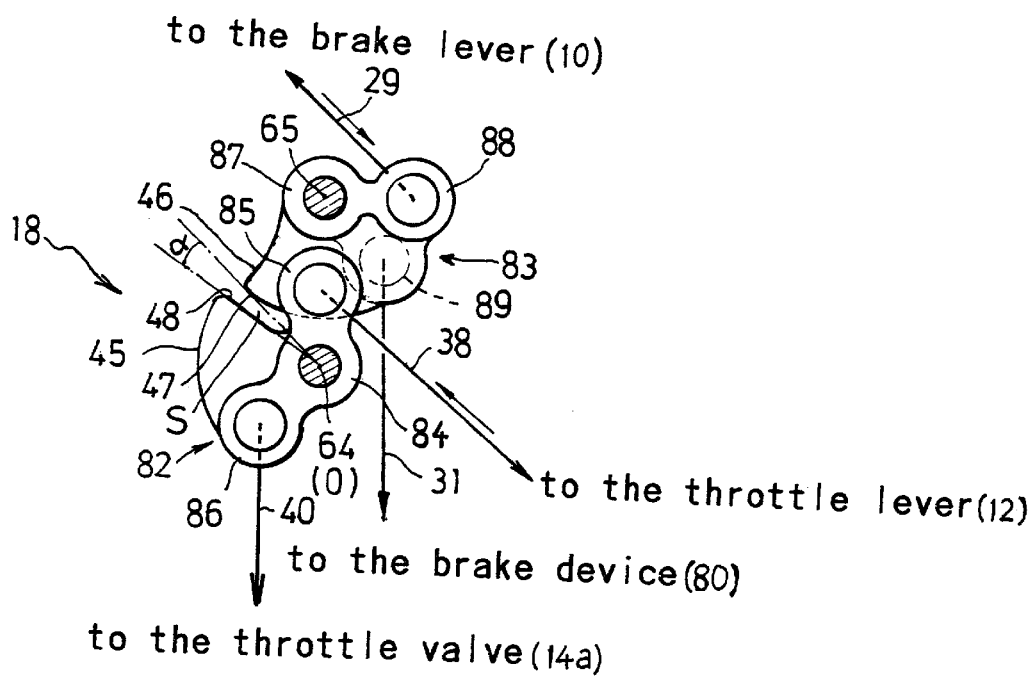
FIG. 18 is a plan view showing the control link mechanism of the third example in a braked state.

When the throttle lever 12 is in the output stopping position, the output manipulation gang member 82 maintains the idling rotation position shown in FIG. 18 by the force applied to the throttle valve 14a in the direction to the idling rotation opening degree. When the operator moves the throttle lever 12 in the output increasing direction, the output manipulation gang member 82 turns in the clockwise direction viewed from above around the output manipulation gang member supporting shaft 64 corresponding to the movement of the throttle lever 12, so as to become in the output position shown in FIG. 19. When the operator move (release) the throttle lever 12 back to the output stopping position, the output manipulation gang member 82 turns in the opposite direction (in the counterclockwise direction viewed from above) around the output manipulation gang member supporting shaft 64 by the force applied to the throttle valve 14a in the direction to the idling rotation opening degree, and returns to the idling rotation position shown in FIG. 18.

Figure 17:
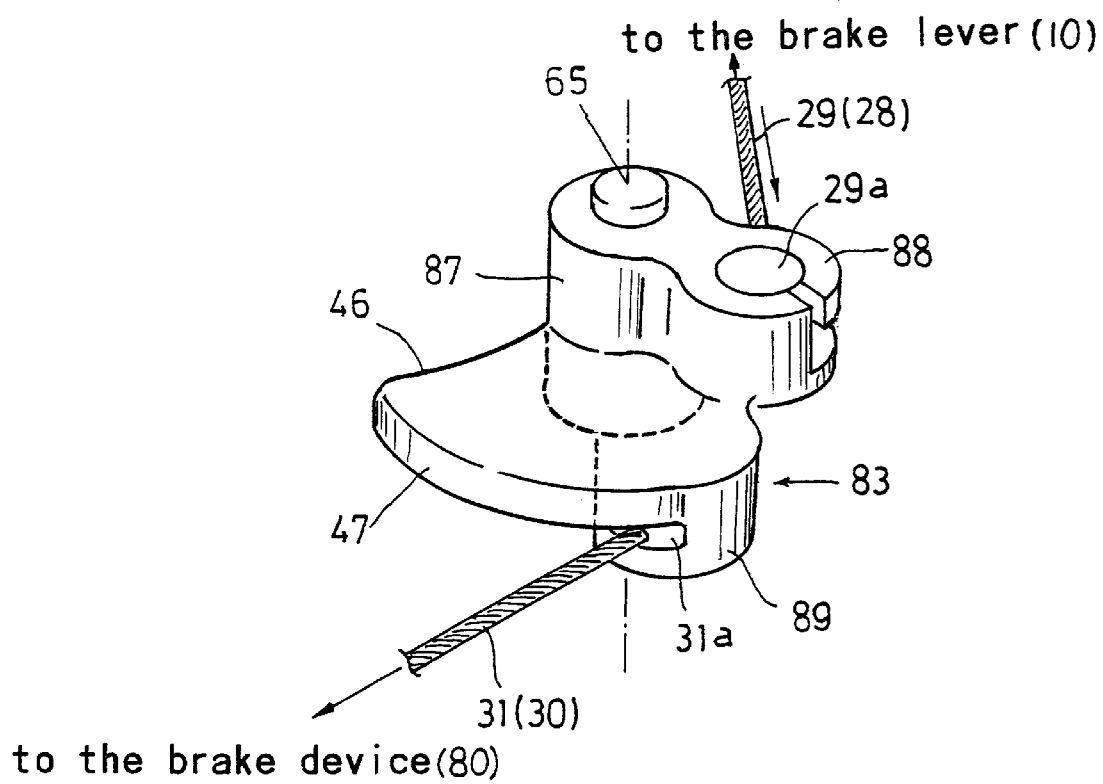
FIG. 17 is an enlarged perspective view of an brake manipulation gang member according to the third example.

As shown in FIG. 17, the front side brake manipulation gang member 83 also includes a hub portion 87 for receiving the brake manipulation gang member supporting shaft 65 rotatably and two swing edge portions 88 and 89 molded as a single unit with the hub portion 87 and shifted positions from each other horizontally and vertically. The first swing edge portion 88 is connected to an end 29a of the inner wire 29 of the first brake manipulating Bowden cable 28 that constitutes the brake manipulating Bowden cable 15, while the other end 29b of the inner wire 29 is connected to the brake lever 10 as shown in FIG. 14.

On the other hand, the second swing edge portion 89 of the brake manipulation gang member 83 is connected to an end 31a of the inner wire 31 of the second throttle manipulating Bowden cable 30 that constitutes the brake manipulating Bowden cable 15 together with the first brake manipulating Bowden cable 28, while the other end 31b of the inner wire 31 is connected to the brake shoe 81 (see FIG. 14). Inner end portions 32a and 33a of outer tubes 32 and 33 of the first and the second brake manipulating Bowden cables 28 and 30 are fixed to the housing 19 by proper means respectively as shown in FIG. 15.

The inner wires 29 and 31 of the brake manipulating Bowden cable 15 are normally pulled to the clutch drum 5a side by the force given to the brake shoe 81 in the direction toward the braking position. Therefore, the brake manipulation gang member 83 maintains the braking position shown in FIG. 18 when the brake lever 10 is released. When the operator grips the brake lever 10 together with the left grip 9, the brake manipulation gang member 83 turns in the counterclockwise direction around the brake manipulation gang member supporting shaft 65 viewed from above corresponding to the movement of the brake lever 10 to become in the releasing position shown in FIG. 19. When the operator release the brake lever 10, the brake manipulation gang member 83 turns in the opposite direction around the brake manipulation gang member supporting shaft 65 to return to the braking position shown in FIG. 18.

In the same manner as the second example, to prevent an interference between the inner wires 31 and 38 (see FIG. 18) in the housing 19, which extend from the output manipulation gang member 82 and the brake manipulation gang member 83 in the direction of crossing with each other viewed from above, the positions of the swing edge portions 85 and 89 of the output and the brake manipulation gang members 82 and 83 are shifted from each other in the vertical direction.

The output and the brake manipulation gang members 82 and 83 have a pair of brake manipulation restriction portion 45 and 46, and a pair of output manipulation restriction portion 47 and 48 respectively, similarly to the second example. They abut to each other at a predetermined timing to restrict the movement of the opposing member, so that the manipulation of the brake lever 10 in the braking direction and the manipulation of the throttle lever 12 in the output increasing direction are restricted alternately.

Figure 19:
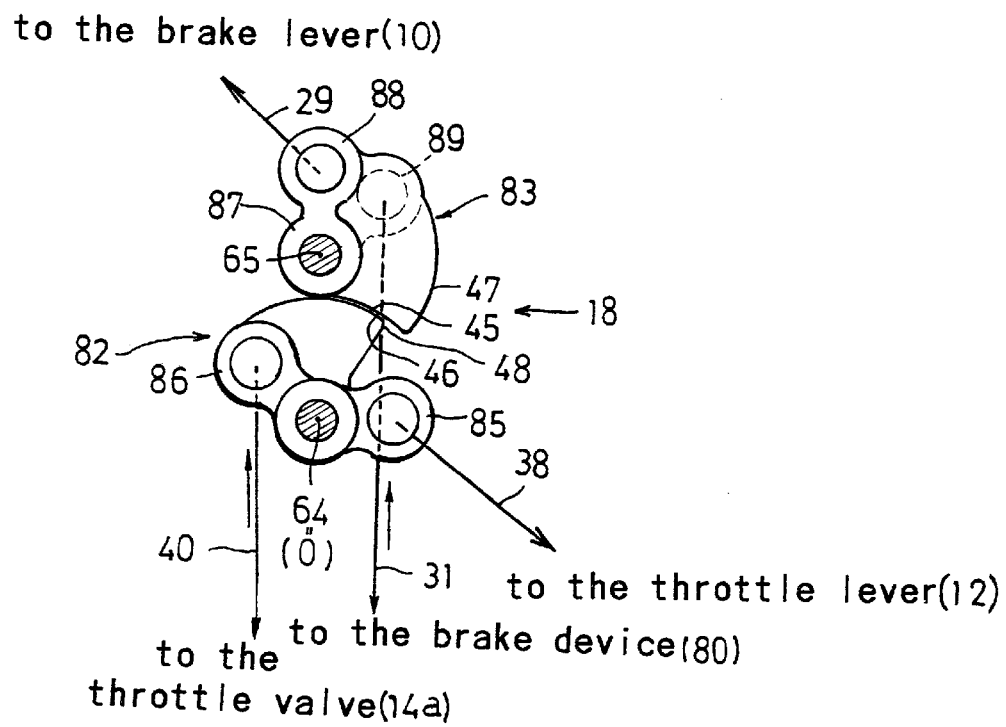
FIG. 19 is a plan view showing the control link mechanism of the third example in an output state.

In other words, as an output manipulation restriction portion, as shown in FIGS. 18 and 19, the brake manipulation gang member 83 is provided with a throttle lever movement restriction portion 47 that is located within the rotation range of the output manipulation gang member 82 when the brake manipulation gang member 83 is in the braking position shown in FIG. 18, and moves out of the rotation range of the output manipulation gang member 82 when the brake manipulation gang member 83 is transferred to the releasing position shown in FIG. 19. The throttle lever movement restriction portion 47 is integrated with the hub portion 87. On the other hand, the output manipulation gang member 82 is provided with a contact portion 48 that abuts the throttle lever movement restriction portion 47. Therefore, when the cutter blade 2 is in braked state by the brake device 80, even if the throttle lever 12 is mismanipulated to move in the output increasing direction, the contact portion 48 of the output manipulation gang member 82 abuts the throttle lever movement restriction portion 47 of the brake manipulation gang member 83. As a result, the throttle lever 12 cannot move so much that a rotation speed of the engine 3 increases and the centrifuge clutch 5 connects the power output to the cutter blade 2.

In this third example too, an engine start assist gap S is provided corresponding to a predetermined swing angle a of the output manipulation gang member 82 between the output manipulation restriction portions 47 and 48 as shown in FIG. 18.

As the brake manipulation restriction portion, as shown in FIGS. 18 and 19, the output manipulation gang member 82 is provided with a brake lever movement restriction portion 45 that is located within the rotation range of the brake manipulation gang member 83 when the output manipulation gang member 82 is in the output position shown in FIG. 19, and moves out of the rotation range of the brake manipulation gang member 83 when the output manipulation gang member 82 is transferred to the idling rotation position shown in FIG. 18. On the other hand, the brake manipulation gang member 83 is provided with a contact portion 46 that abuts the brake lever movement restriction member 45. Therefore, when the throttle valve 14a is opened so that the centrifuge clutch 5 connects the power output to the cutter blade 2, even if the operator mismanipulate to release only the brake lever 10, the contact portion 46 of the brake manipulation gang member 83 abuts the brake lever movement restriction member 45 of the output manipulation gang member 82. As a result, the brake lever 10 cannot move so much that the brake device 80 works.

In this third example, on the contrary to the second example (shown in FIG. 10), as shown in FIG. 15, the manipulation handle attachment member assembly fastening bolt 56 that constitutes the manipulation handle attachment member 7 is disposed at the front of the manipulation handle 8. The manipulation handle 8 can be turned in the clockwise direction viewed from above on the contrary to the second example when the grass cutting machine is stored or transported, so that the first brake manipulating Bowden cable 28 and the first throttle manipulating Bowden cable 37 are not provided with an excessive tension when the manipulation handle 8 is turned. The first brake manipulating Bowden cable 28 extends from the front left side of the housing 19 in the left and front direction viewed from above, so as to reach the brake lever 10, while the first throttle manipulating Bowden cable 37 extends from the rear right side of the housing 19 in the right and rear direction viewed from above, so as to reach the throttle lever 12.

Other structures and actions in this third example are the same as the second example, so the explanation of them is eliminated.

FOURTH EXAMPLE

A fourth example of the present invention will be explained with reference to FIGS. 20 to 27. In the figures of this fourth example, the same reference numerals are used for the same elements as in the first example.

Figure 20:
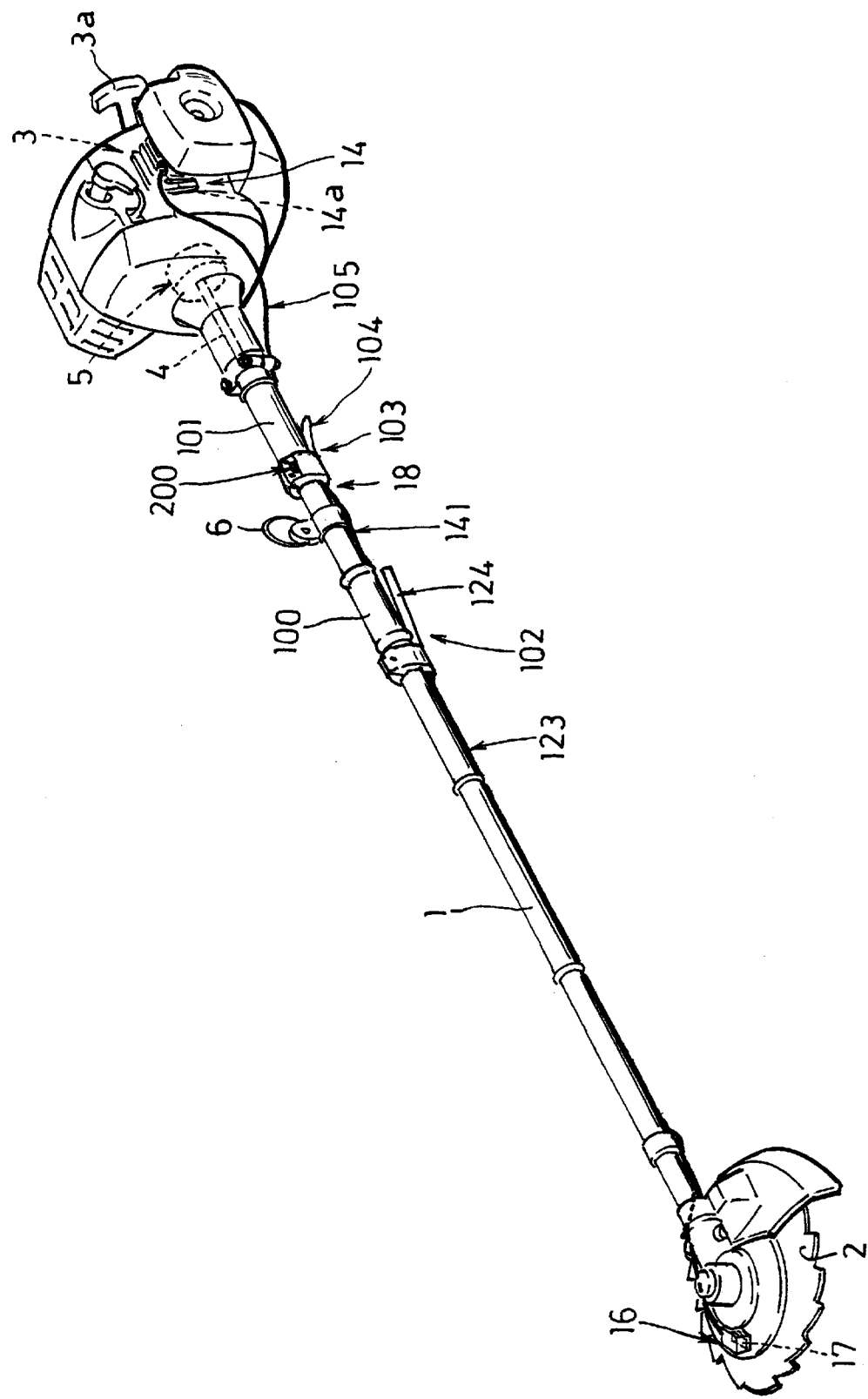
FIG. 20 is a general perspective view of a grass cutting machine as a fourth example of a power machine according to the present invention.

The grass cutting machine according to the fourth example does not include a separate manipulation handle 8 from the manipulation rod 1, but has two grip portions 100 and 101 fixed on the straight manipulation rod 1 as shown in FIG. 20. Adjacent to the front grip portion 100, which is usually gripped by the left hand, a brake lever device 102 for manipulating brake operation of the cutter blade 2 is disposed so that the operator can release the brake operation by releasing the hand gripping the front grip portion 100. On the other hand, adjacent to the rear grip portion 101, which is usually gripped by the right hand, a throttle lever device 103 is disposed so that the operator can increase or decrease rotation speed of the engine 3 by a finger of the hand gripping the rear grip portion 101.

First, the throttle lever device 103 will be explained. A throttle lever 104 of the throttle lever device 103 is connected to the throttle valve 14a of the carburetor 14 that is an output control member of the engine 3 via a throttle manipulating Bowden cable 105 as shown in FIG. 20. In this example, the throttle valve 14a is normally pulled in the direction of returning to the idling rotation opening degree automatically. If an inner wire 106 of the throttle manipulating Bowden cable 105 that is connected to the throttle valve 14a (see FIG. 22) is pulled more than a predetermined distance from the non-manipulated state by gripping manipulation of the throttle lever device 103, the throttle valve 14a opens in the direction increasing the speed of the engine 3 (output increasing direction) from the idle rotation opening degree.

Figure 21:
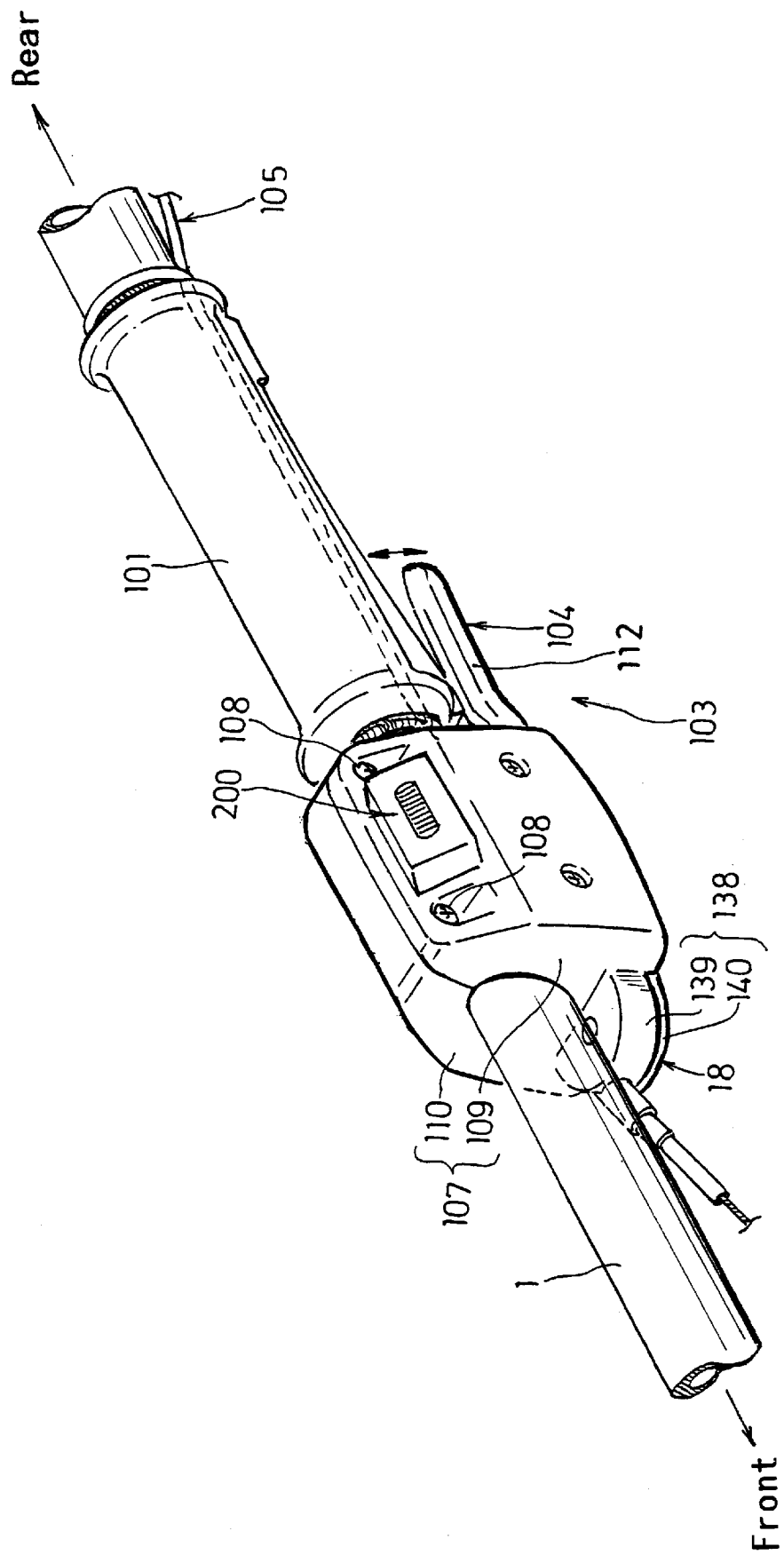
FIG. 21 is a general perspective view of a throttle lever device of the grass cutting machine shown in FIG. 20.

As shown in FIG. 21, the throttle lever device 103 has a throttle lever housing 107 for supporting the throttle lever 104 pivotably. The throttle lever housing 107 includes a left casing half 109 and a right casing half 110 that are combined with each other by plural bolts 108, 108 so that the manipulation rod 1 is fixed between the casing halves 109 and 110 as shown in FIG. 21. The throttle lever housing 107 is disposed adjacent to the front of the rear grip portion 101. Each of the left and right casing halves 109 and 110 has a contour like a rectangular dish facing the horizontal direction, and is made of a light material such as a synthetic resin for saving weight of the machine.

The throttle lever 104 has a substantially L-shaped contour viewed from side, at the top of which a hub portion 111 whose axis extends horizontally is disposed. In this hub portion 111, one of the plural volts 108 for assembling the throttle lever housing 107 is inserted rotatably as a pivot shaft for the throttle lever 104 (see FIG. 22).

A manipulation portion 112 of the throttle lever 104 extends from the rear bottom portion of the throttle lever housing 107 in the slanting downward direction below the rear grip portion 101 as shown in FIG. 21. The throttle lever 104 is normally provided with a force by a restoring spring (not shown) of the throttle valve 14a so that the manipulation portion 112 is maintained in the idling opening degree position that is the lowest position away from the rear grip portion 101 as shown in FIG. 21. When the .operator grips the manipulation portion 112 of the throttle lever 104 together with the rear grip portion 101, the inner wire 106 of the throttle manipulating Bowden cable 105 is pulled to the front of the manipulation rod 1, and the throttle valve 14a is opened from the idling rotation opening degree. On the contrary, when the operator releases the manipulation portion 112 of the throttle lever 104, the inner wire 106 of the throttle manipulating Bowden cable 105 is pulled back to the rear of the manipulation rod 1, and the throttle valve 14a is returned to the idling rotation opening degree automatically.

In this example, an output manipulation gang member 113 that moves corresponding to the manipulation of the throttle lever 104 is inserted in the output manipulation system from the throttle lever 104 to the throttle valve 14a. This output manipulation gang member 113 is supported pivotablly in the horizontal direction by a vertical pivot shaft 114, which is fixed to the inside wall of the right casing half 110 at the upper and the lower ends thereof as shown in FIG. 22.

One swing edge portion (left swing edge portion) 115 of the output manipulation gang member 113 is engaged with an end metal 116 attached to the front end of the inner wire 106 of the throttle manipulating Bowden cable 105. Though not shown, the front edge 117a of the outer tube 117 of the throttle manipulating Bowden cable 105 is fixed to the throttle lever housing 107 by proper means.

Figure 22:
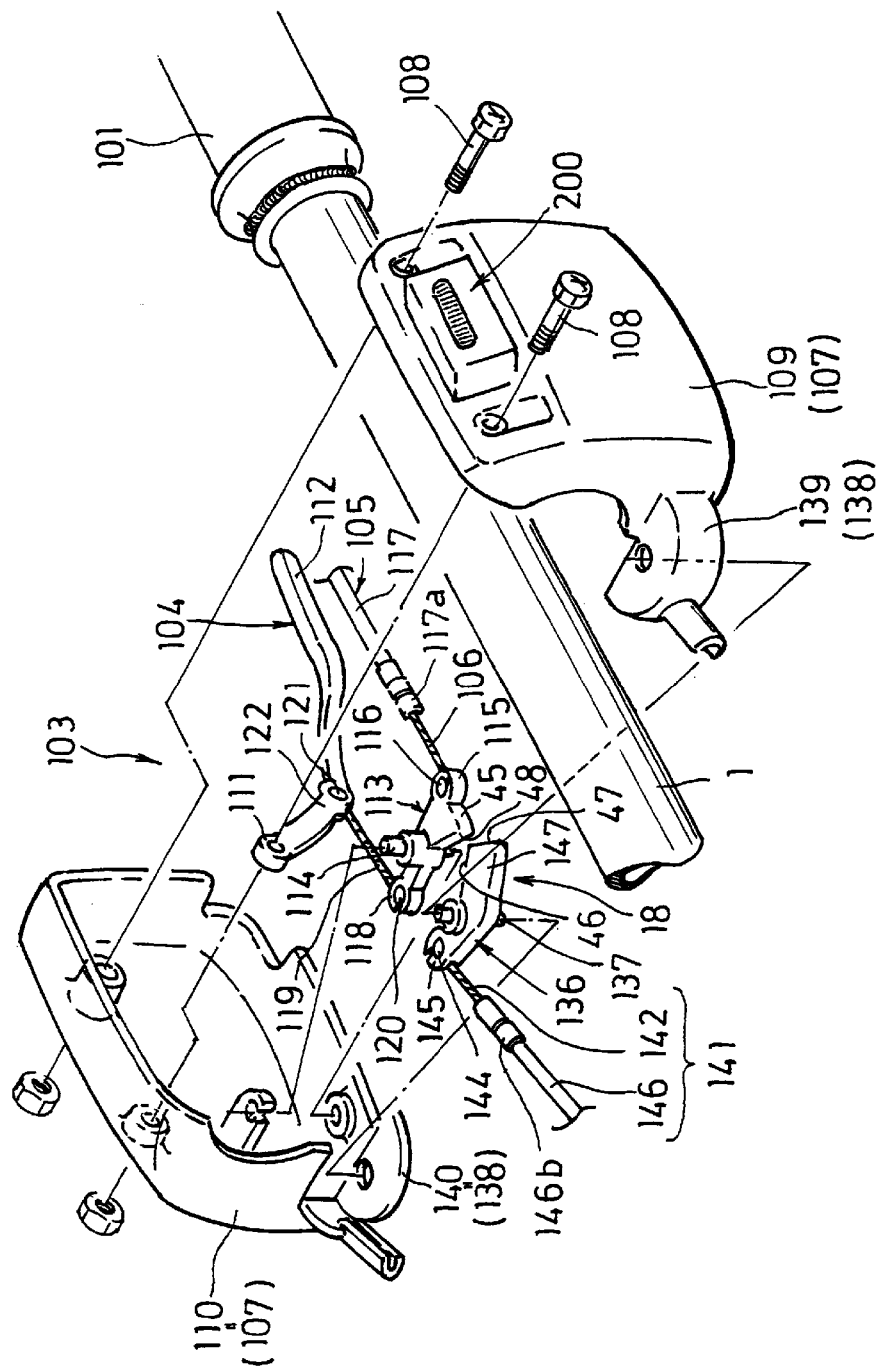
FIG. 22 is an exploded view of the throttle lever device.

On the other hand, the other swing edge portion (right swing edge portion) 118 of the output manipulation gang member 113 is engaged with an end metal 120 attached to the front end of the lever side wire 119 as shown in FIG. 22. An end metal 121 attached to the rear end of the lever side wire 119 is engaged with a swing curved portion 122 of the throttle lever 104.

Figure 26:
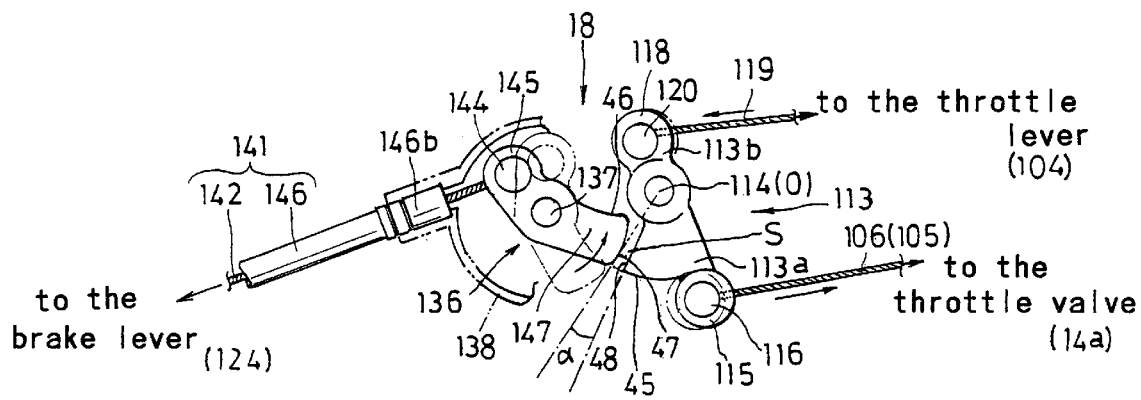
FIG. 26 is a plan view of a control link mechanism according to a fourth example in a braked state.
Figure 27:
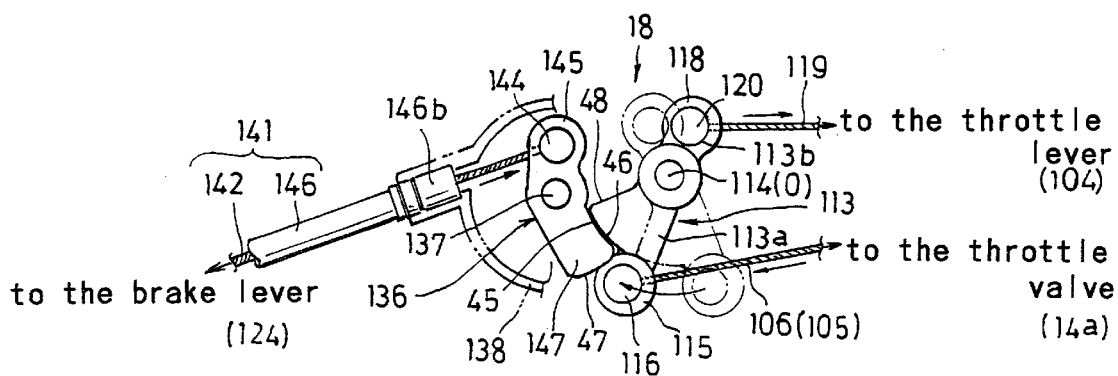
FIG. 27 is a plan view of a control link mechanism according to a fourth example in an output state.

In the illustrated example, the left and the right swing arms 113a and 113b of the output manipulation gang member 113 have a different length as shown in FIGS. 26 and 27. Thus, the small movement of the throttle lever 104 is enlarged to control the throttle valve 14a in the large movement range, so that the throttle lever device 103 can be a compact size.

Furthermore, an engine stop switch 200 is disposed at the left upper portion of the throttle lever housing 107, so that the operator can manipulate the switch 200 with the thumb of the hand gripping the rear grip portion 101.

Next, the brake lever device 102 will be explained.

As shown in FIG. 20, the brake lever device 102 is connected to the brake device 16 via a brake manipulating Bowden cable 123 that is a brake force transmission member. The brake device 16 has the same structure as the first example.

The brake manipulating Bowden cable 123 is placed close to and along the manipulation rod 1 so as not to disturb the cutting operation with swinging the manipulation rod 1 horizontally, in the same manner as the first example.

Figure 23:
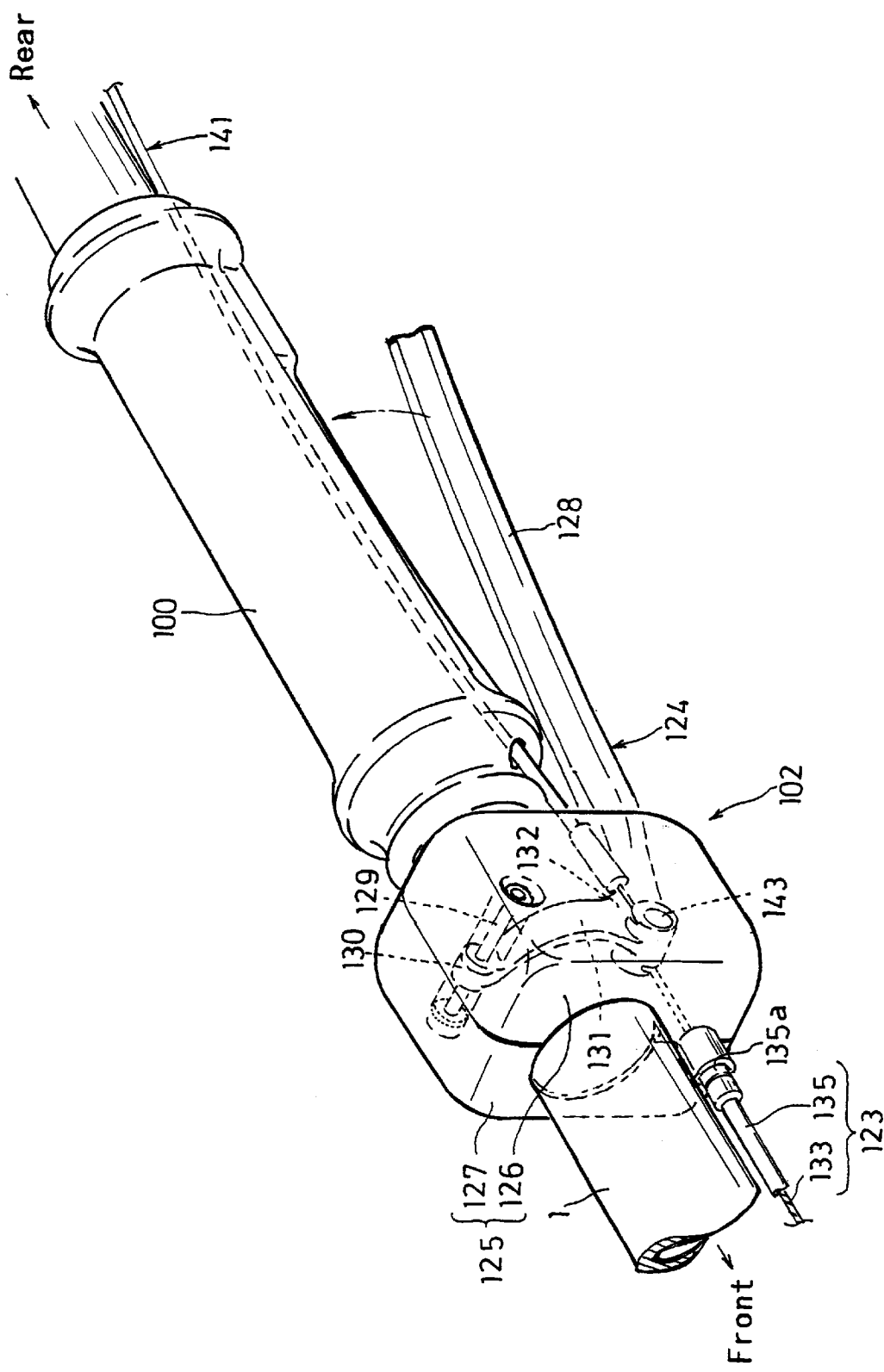
FIG. 23 is a general perspective view of a brake lever device of the grass cutting machine shown in FIG. 20.

As shown in FIG. 23 that is a general perspective view, the brake lever device 102 has a brake lever housing 125 for supporting the brake lever 124 pivotably. The brake lever housing 125 includes a left casing half 126 and a right casing half 127 that are combined with each other so that the manipulation rod 1 is fixed between the casing halves 126 and 127. The brake lever housing 125 is disposed adjacent to the front of the front grip portion 100. Each of the left and right casing halves 126 and 127 has a contour like a rectangular dish facing the horizontal direction as shown in FIG. 24 that is an exploded view, and is made of a light material such as a synthetic resin for saving weight of the machine.

As shown in FIG. 23, a manipulation portion 128 of the brake lever 124 extends from the rear bottom portion of the brake lever housing 125 in the slanting downward direction below the front grip portion 100. The brake lever 124 is normally provided with a force so that the manipulation portion 128 is maintained in the brake position shown in FIG. 23 that is the lowest position away from the front grip portion 100.

Figure 24:
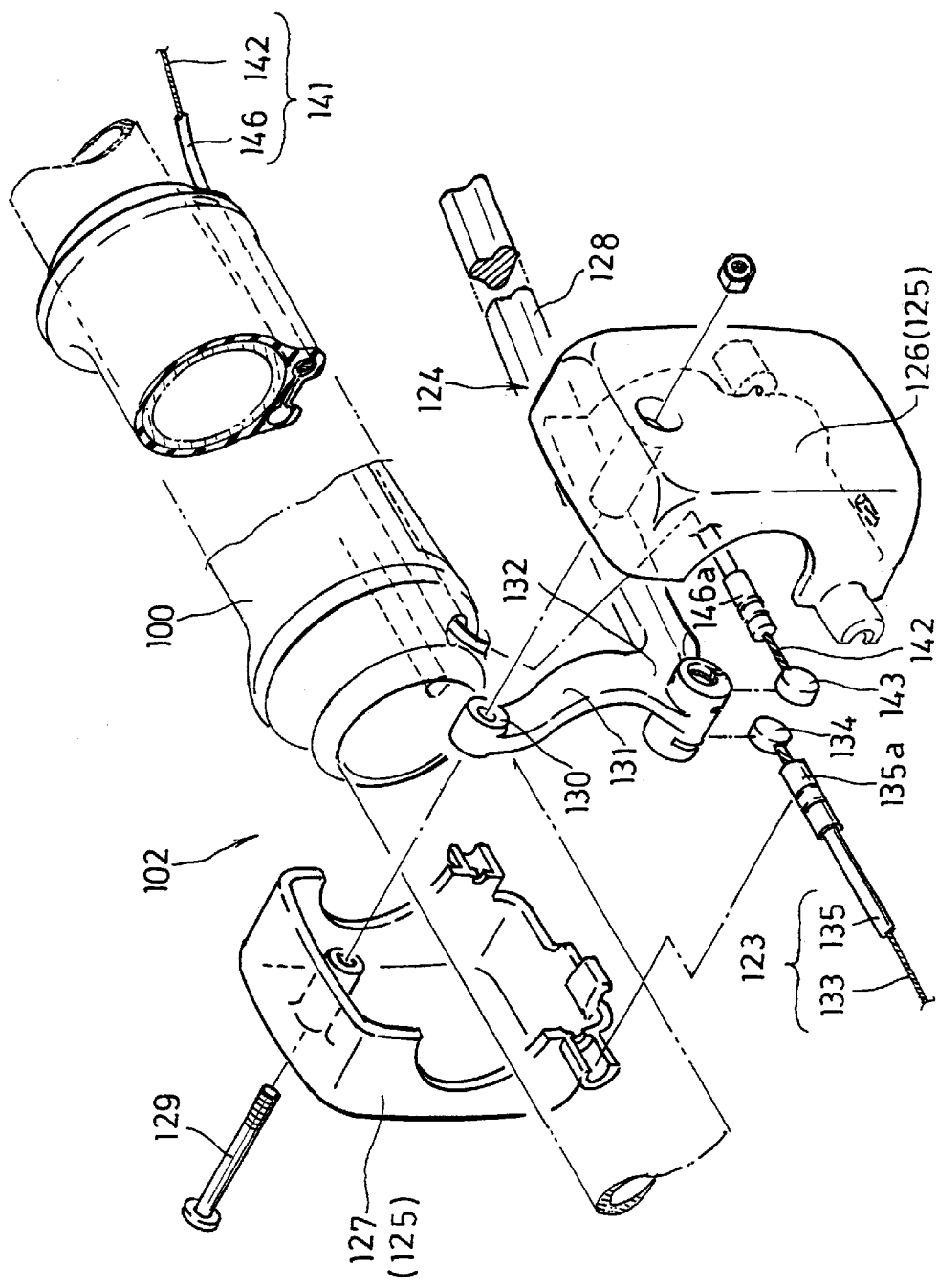
FIG. 24 is an exploded view of the brake lever device shown in FIG. 23.

In FIG. 24, adding to the manipulation portion 128, the brake lever 124 has a hub portion 130 for receiving a pivot shaft 129 rotatably, and a vertical arm portion 131 that extends downward from the hub portion 130 to the manipulation portion 128. In other words, the brake lever 124 has a substantially L-shaped contour viewed from side, at the top of which the hub portion 130 is disposed. In this example, the vertical arm portion 131 is curved horizontally so as not to interfere with the outer surface of the manipulation rod 1. Thus, the brake lever device 102 can be a compact size. The horizontal pivot shaft 129 of the brake lever 124 is also a bolt for fastening the left and right casing halves 126 and 127, and is inserted in the left and right casing halves 126 and 127 at the upper portion thereof.

Figure 25:
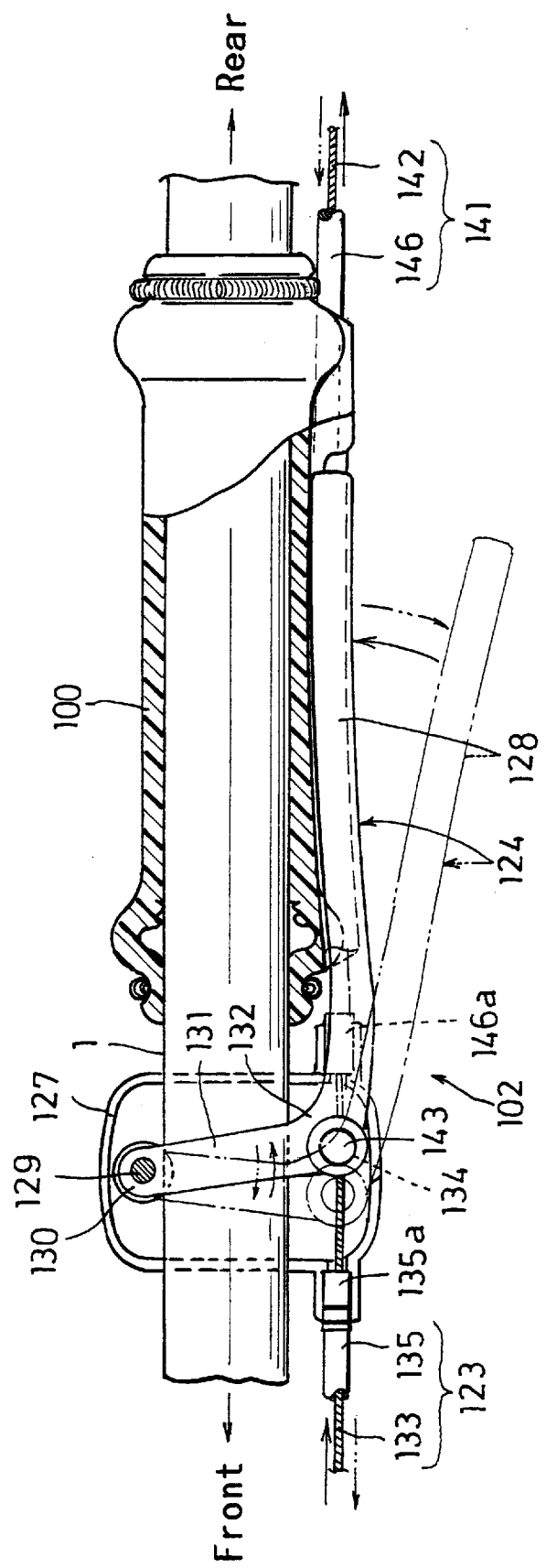
FIG. 25 is a section view of the brake lever device shown in FIG. 23.

The curved portion 132 between the manipulation portion 128 and the vertical arm portion 131 of the brake lever 124 is engaged with an end metal 134 fixed to the rear end of the inner wire 133 of the brake manipulating Bowden cable 123. The brake manipulating Bowden cable 123 extends to the front along the manipulation rod 1 and is connected to the brake shoe 17 (see FIG. 20), while the rear edge portion 135*a* of the outer tube 135 of the brake manipulating Bowden cable 123 is fixed to the brake lever housing 125 as shown in FIG. 25.

In FIG. 20, the control link mechanism 18 explained below is disposed between the output manipulation system form the throttle lever device 103 to the throttle valve 14*a*, and the brake manipulation system from the brake lever device 102 to the brake shoe 17.

The control link mechanism 18 has the output manipulation gang member 113 that moves along with the throttle lever 104, and a brake manipulation gang member 136 that is disposed adjacent to the front of the output manipulation gang member 113 and that moves along with the brake lever 124 as shown in FIG. 22. In the illustrated example, in order to save a vertical thickness of the control link mechanism 18 and a horizontal protrusion of the manipulation rod 1 due to the control link mechanism 18, the output manipulation gang member 113 and the brake manipulation gang member 136 are arranged from the front to the rear of the manipulation rod 1 to swing in the same plane.

The output manipulation gang member 113 holds a predetermined idling rotation position shown in FIG. 26 when the opening degree of the throttle valve 14*a* is the idling rotation opening degree. When the operator manipulates the throttle lever 104 in the output increasing direction, the output manipulation gang member 113 turns in the clockwise direction viewed from above corresponding to the movement of the throttle lever 104, so as to become in the output position shown in FIG. 27 for example.

On the other hand, the brake manipulation gang member 136 is supported by a vertical pivot shaft 137 in a brake manipulation gang member housing 138 so as to rotate horizontally. The brake manipulation gang member housing 138 is compactly molded as one unit with the throttle lever housing 107 at the front portion, and is disposed under the manipulation rod 1 (see FIG. 21). In this example as shown in FIG. 22, the brake manipulation gang member housing 138 includes an upper casing half 139 and a lower casing half 140 that are engaged with each other. The upper casing half 139 is molded as one unit with the left casing half 109 of the throttle lever housing 107. The lower casing half 140 is molded as one unit with the right casing half 110 of the throttle lever housing 107.

The brake manipulation gang member 136 is connected with the brake lever 124 via a brake manipulation gang member driving Bowden cable 141 that can be manipulated in pulling and pushing directions as shown in FIG. 25.

As shown in FIG. 24, the curved portion 132 of the brake lever 124 is engaged with an end metal 143 fixed to the front end of the inner wire 142 of the brake manipulation gang member driving Bowden cable 141. The brake manipulation gang member driving Bowden cable 141 extends to the rear along the manipulation rod 1 and an end metal 144 fixed to the rear end of the inner wire 142 is engaged with the swing edge portion (right swing edge portion) 145 of the brake manipulation gang member 136. Front and rear edge portions 146*a* and 146*b* of an outer tube 146 of the brake manipulation gang member driving Bowden cable 141 are fixed to the brake lever housing 125 and the brake manipulation gang member housing 138, respectively (as shown in FIGS. 25 and 22).

As a result, when the manipulation portion 128 of the brake lever 124 is released as shown in an imaginary line in FIG. 25 (i.e., when the brake device 16 is in the braking state), the inner wire 142 of the brake manipulation gang member driving Bowden cable 141 is pulled to the front by a predetermined distance, and the brake manipulation gang member 136 is normally held in the braking position shown in the full line in FIG. 26.

As shown in the full line in FIG. 25, when the operator grips and moves the manipulation portion 128 of the brake lever 124 upward to the front grip portion 100, the curved portion 132 of the brake lever 124 moves backward. Then, the inner wire 133 of the brake manipulating Bowden cable 123 is pulled to the rear of the manipulation rod 1 so that the brake device 16 is released and the inner wire 142 of the brake manipulation gang member driving Bowden cable 141 is pushed back in the outer tube 146. Thus, the brake manipulation gang member 136 turns a predetermined angle in the clockwise direction viewed from above and transfers to the releasing position shown in FIG. 27.

As shown in FIG. 23, the brake manipulation gang member driving Bowden cable 141 is disposed so as to pass through the front grip portion 100 and not to disturb gripping operation.

The output manipulation gang member 113 and the brake manipulation gang member 136 have a pair of brake manipulation restriction portion 45 and 46, and a pair of output manipulation restriction portion 47 and 48 respectively, which abut to each other at a predetermined timing to restrict the movement of the opposing member, so that the manipulation of the brake lever 124 in the braking direction and the manipulation of the throttle lever 104 in the output increasing direction are restricted alternately.

In other words, as an output manipulation restriction portion, as shown in FIG. 26, the other swing edge portion (the left swing edge portion) 147 of the brake manipulation gang member 136 is provided with a throttle lever movement restriction portion 47 that is located within the rotation range of the output manipulation gang member 113 when the brake manipulation gang member 136 is in the braking position shown in FIG. 26, and moves out of the rotation range of the output manipulation gang member 113 when the brake manipulation gang member 136 is transferred to the releasing position shown in FIG. 27. On the other hand, the left swing arm 113a of the output manipulation gang member 113 is provided with a contact portion 48 that abuts the throttle lever movement restriction portion 47. Therefore, when the cuter blade 2 is in the braked state by the brake device 16, even if the throttle lever 104 is mismanipulated in the output increasing direction, the contact portion 48 of the output manipulation gang member 113 abuts the throttle lever movement restriction portion 47 of the brake manipulation gang member 136. As a result, the throttle lever 104 cannot move so much that a rotation speed of the engine 3 exceeds a predetermined value and the centrifuge clutch 5 connects the power to the cutter blade 2.

In this fourth example too, an engine start assist gap S is provided corresponding to a predetermined swing angle a of the output manipulation gang member 113 between the output manipulation restriction portions 47 and 48 as shown in FIG. 26.

As the brake manipulation restriction portion, as shown in FIG. 27, the output manipulation gang member 113 is provided with a brake lever movement restriction portion 45 that is located within the rotation range of the brake manipulation gang member 136 when the output manipulation gang member 113 is in the output position shown in FIG. 27, and moves out of the rotation range of the brake manipulation gang member 136 when the output manipulation gang member 113 is transferred to the idling rotation position shown in FIG. 26. On the other hand, the brake manipulation gang member 136 is provided with a contact portion 46 that abuts the brake lever movement restriction member 45. Therefore, when the throttle valve 14a is opened so that the centrifuge clutch 5 connects the power output to the cutter blade 2, even if the operator mismanipulate to release only the brake lever 10, the contact portion 46 of the brake manipulation gang member 136 abuts the brake lever movement restriction member 45 of the output manipulation gang member 113. As a result, the brake lever 124 cannot move so much that the brake device 16 works.

In this fourth example, as shown in FIG. 24, each of the brake manipulation gang member driving Bowden cable 141 and the brake manipulating Bowden cable 123 is connected to the brake lever 124, and the two Bowden cables 123 and 141 extend along the manipulation rod 1 to different directions, the front and the rear. Therefore, the brake device 102 can be a compact size with a small protrusion in the width direction of the manipulation rod 1.

Other structures and actions in this fourth example are the same as the first example, so the explanation of them is eliminated.

What is claimed is:

1. A power machine comprising:
    an output manipulation system for controlling an output of a power source given to a working member;
    a brake manipulation system for stopping the movement of the working member;
    a pair of output manipulation restriction portions disposed between the output manipulation system and the brake manipulation system, the output manipulation restriction portions abutting to each other so as to restrict output manipulation to the working member by an output manipulation member when the working member is in the braked state; and
    a pair of brake manipulation restriction portions disposed between the output manipulation system and the brake manipulation system, the brake manipulation restriction portions abutting to each other so as to restrict brake manipulation of the working member by a brake manipulation member when the power source gives the output to the working member;
    a housing in which the output manipulation gang member and the brake manipulation gang member are disposed; and
    a manipulation rod that supports the working member, and a manipulation handle that is connected with the manipulation rod, the manipulation handle having the output manipulation member and the brake manipulation member, wherein the housing is disposed between the manipulation rod and the manipulation handle.

2. The power machine according to claim 1, further comprising an output manipulation gang member that moves along with the output manipulation member and is connected to an output control member of the power source, and a brake manipulation gang member that moves along with the brake manipulation member and is connected to a brake member, wherein each of the output manipulation gang member and the brake manipulation gang member is provided with a set of the output manipulation restriction portion and the brake manipulation restriction portion.

3. The power machine according to claim 1, further comprising an output manipulation gang member that moves along with the output manipulation member and is connected to an output control member of the power source, wherein the brake manipulation member is connected to a brake member and a brake manipulation gang member via different paths, and each of the output manipulation gang member and the brake manipulation gang member is provided with a set of the output manipulation restriction portion and the brake manipulation restriction portion.

4. The power machine according to claim 1, wherein the power source is an internal combustion engine, and an engine start assist gap is provided between the pair of output manipulation restriction portions, the gap permitting the movement of the output manipulation member within a predetermined range so that a throttle valve of a carburetor can open to the extent that the engine can start smoothly but the working member can not move when the working member is in the braked state.

5. The power machine according to claim 2, wherein the output manipulation gang member and the brake manipulation gang member are arranged in the longitudinal direction of the manipulation rod supporting the working member, and are disposed adjacent to the manipulation rod.

6. The power machine according to claim 2, wherein the output manipulation gang member and the brake manipulation gang member are pivoted.

7. The power machine according to claim 6, wherein the brake manipulation restriction portion include a sector shaped portion whose center is a swing center of the output manipulation gang member.

8. The power machine according to claim 1, further comprising transmission members connected to the output manipulation gang member and the brake manipulation gang member, wherein the connection positions of the transmission members with the output manipulation gang member and the brake manipulation gang member are shifted from each other, so that the transmission members do not contact with each other in the housing.

9. The power machine according to claim 1, wherein the housing includes a first casing half supporting the brake manipulation gang member and a second casing half supporting the output manipulation gang member, which are combined with each other.

10. The power machine according to claim 9, wherein at least one of the casing halves is molded as one unit with another part of the machine.

11. The power machine according to claim 1, wherein the housing includes a plurality of casing halves combined with each other, and at least one of the casing halves is molded as one unit with another part of the machine.

12. The power machine according to claim 1, further comprising a manipulation rod that supports the working member, and a manipulation handle that is connected with the manipulation rod, the manipulation handle having the output manipulation member and the brake manipulation member, wherein an output manipulation gang member and a brake manipulation gang member are disposed between the manipulation rod and the manipulation handle.

13. The power machine according to claim 1, further comprising a manipulation handle attachment member for fixing the manipulation handle to the manipulation rod, the manipulation handle attachment member including a manipulation rod side attachment member and a manipulation handle side attachment member, which are combined with each other in different angles between them.

14. The power machine according to claim 13, wherein a plurality of engaging portions are formed between the manipulation rod side attachment member and the manipulation handle side attachment member, the engaging portions being engaged with each other so that a variable angle can be formed between the manipulation rod side attachment member and the manipulation handle side attachment member, wherein the manipulation rod side attachment member and the manipulation handle side attachment member are fixed removably with each other by a fastening means.

* * * * *